(12) United States Patent
Sumida et al.

(10) Patent No.: US 7,384,178 B2
(45) Date of Patent: Jun. 10, 2008

(54) ILLUMINATION DEVICE FOR FLAT-PANEL DISPLAY AND LIGHT-EMITTING LAMP

(75) Inventors: Yukihiro Sumida, Yamatokoriyama (JP); Takeshi Masuda, Shijonawate (JP); Yuhsaku Ajichi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/875,522

(22) Filed: Jun. 25, 2004

(65) Prior Publication Data
US 2005/0030960 A1 Feb. 10, 2005

(30) Foreign Application Priority Data
Jun. 26, 2003 (JP) .............................. 2003-183629
Mar. 31, 2004 (JP) .............................. 2004-108202

(51) Int. Cl.
*F21V 7/04* (2006.01)
(52) U.S. Cl. ...................... 362/609; 362/603; 362/608; 362/612; 362/615; 362/620
(58) Field of Classification Search ................. 362/612, 362/615, 620, 603, 555, 307, 608, 609
See application file for complete search history.

(56) References Cited
U.S. PATENT DOCUMENTS
5,764,322 A * 6/1998 Mamiya et al. ............... 349/65
5,775,799 A * 7/1998 Forkner ........................ 362/268
6,065,845 A * 5/2000 Miyazaki ........................ 362/26

6,601,962 B1 * 8/2003 Ehara et al. ................. 362/612
6,629,765 B2 * 10/2003 Toyoda et al. .............. 362/612
7,114,839 B2 * 10/2006 Kuo ........................... 362/608
2002/0141174 A1 * 10/2002 Parker et al. ................ 362/31

FOREIGN PATENT DOCUMENTS
JP          07-211940          8/1995
JP          10-335706          12/1998
JP          2002-134793        5/2002

OTHER PUBLICATIONS
Jagt et al; "45.3: Micro-Structured Polymeric Linearly Polarized Light Emitting Lightguide for LCD Illumination"; SID 02 Digest, pp. 1237-1239.

* cited by examiner

Primary Examiner—Stephen F. Husar
Assistant Examiner—Meghan K Dunwiddie
(74) Attorney, Agent, or Firm—Nixon & Vanderhye P.C.

(57) ABSTRACT

An illumination device for a flat panel display may include a light-guiding member for guiding light from a light-emitting lamp, wherein the light-emitting lamp has a light-emitting device incorporated in a lamp body, wherein the lamp body has a reflection surface that reflects light from the light-emitting device and an emitting surface that is opposite to the reflection surface and irradiates the reflected light from the reflection surface toward the light-guiding member. In certain example embodiments, the emitting surface is formed into a shape along the irradiated surface of the light-guiding member and the reflection surface is formed to be curved such that the reflected light is made approximately parallel seen from one direction upon reflecting the light from the light-emitting device.

35 Claims, 23 Drawing Sheets

*Fig. 12*

| Overlapping section of incident section of light-guiding member and non-transparent area 15(mm) | State of band-shaped dark lines |
|---|---|
| 0.00mm | ○ |
| 0.05mm | ○ |
| 0.10mm | ○ |
| 0.12mm | ○ |
| 0.15mm | △ |
| 0.20mm | △ |
| 0.22mm | × |

○ No band-shaped dark lines
△ There are band-shaped dark lines but they are light and non-conspicuous
× There are band-shaped dark lines, and display quality is deteriorated

*Fig. 14*

| Ratio of electrode (non-transparent area) in opening section (14/t*100) | State of black band |
|---|---|
| 0% | ○ |
| 10% | ○ |
| 30% | ○ |
| 50% | △ |
| 70% | △ |
| 80% | × |
| 100% | × |

○ No line-shaped dark lines
△ There are line-shaped dark lines but they are light and non-conspicuous
× There are line-shaped dark lines, and display quality is deteriorated

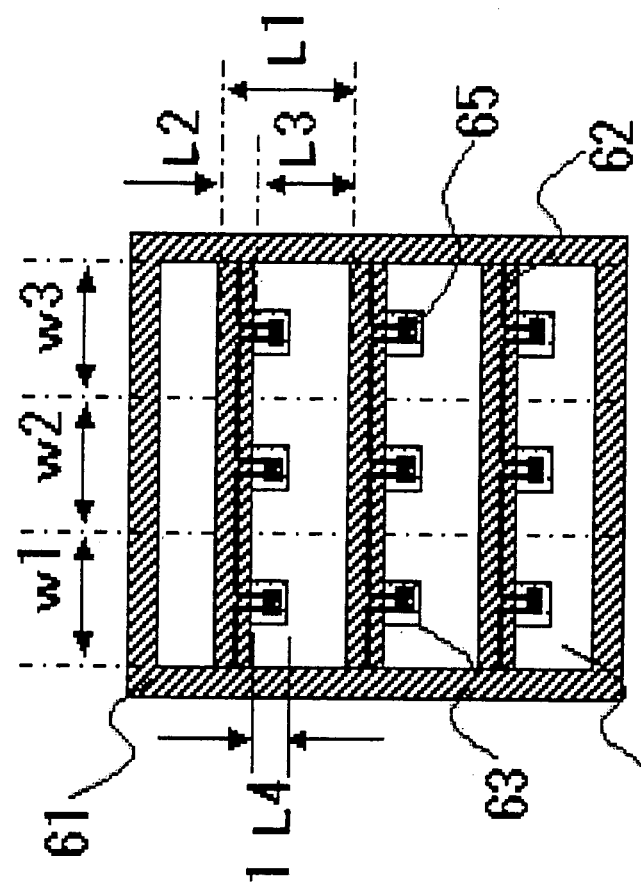
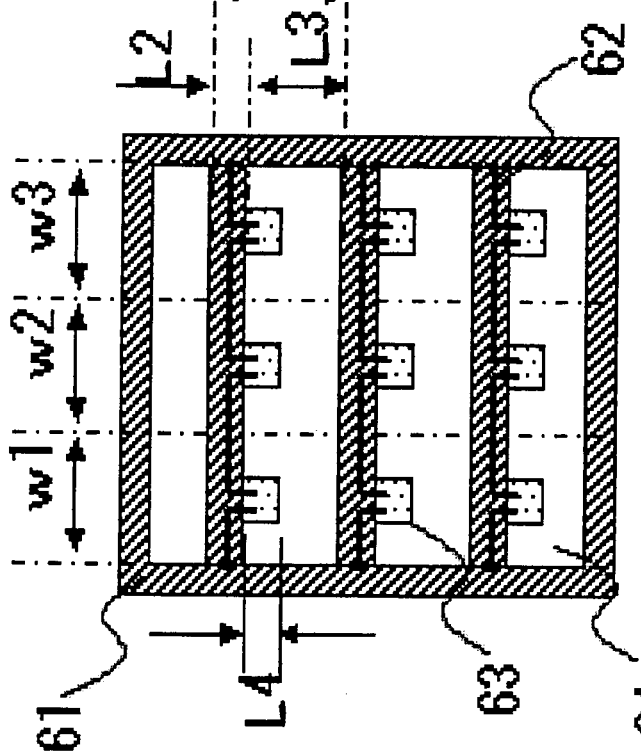

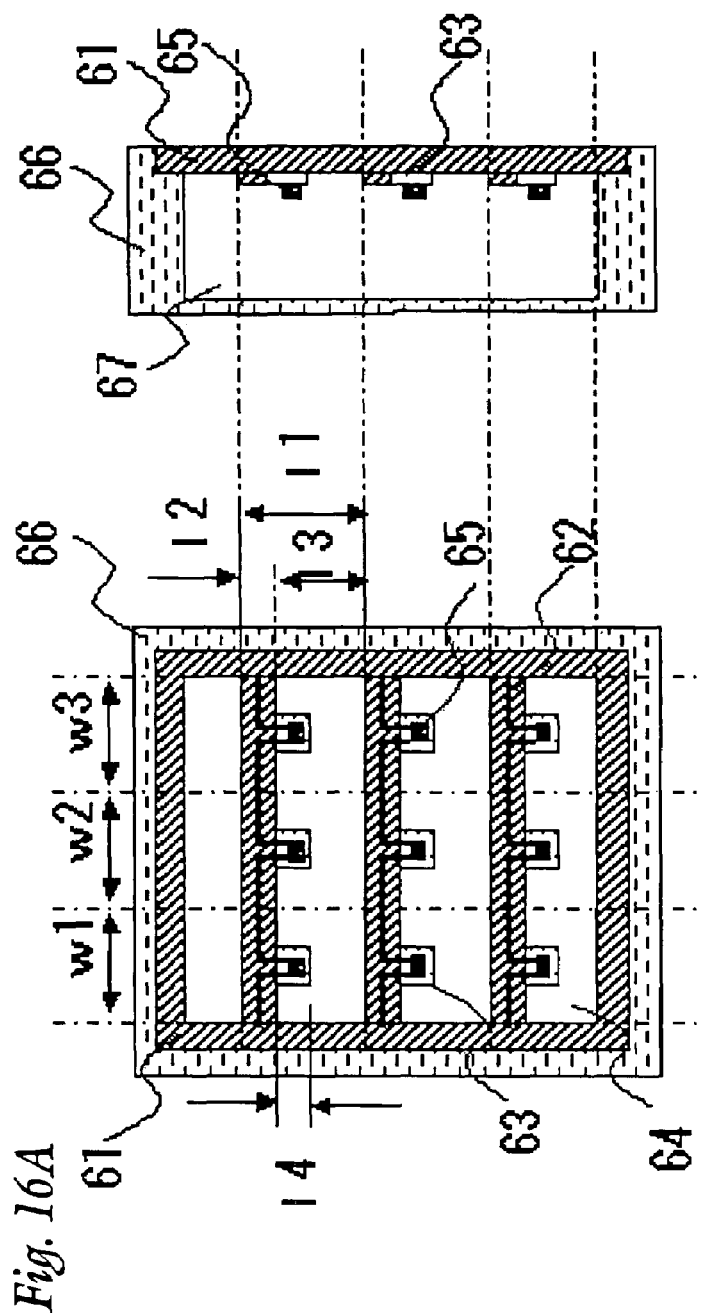
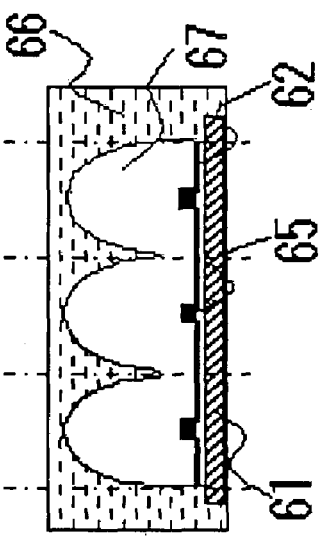
Fig. 16A
Fig. 16B
Fig. 16C

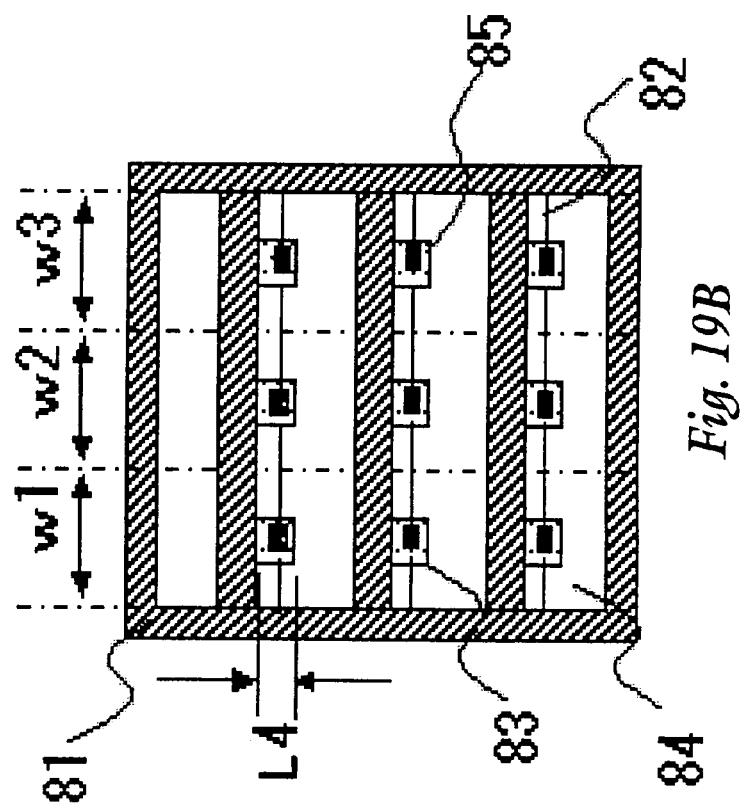
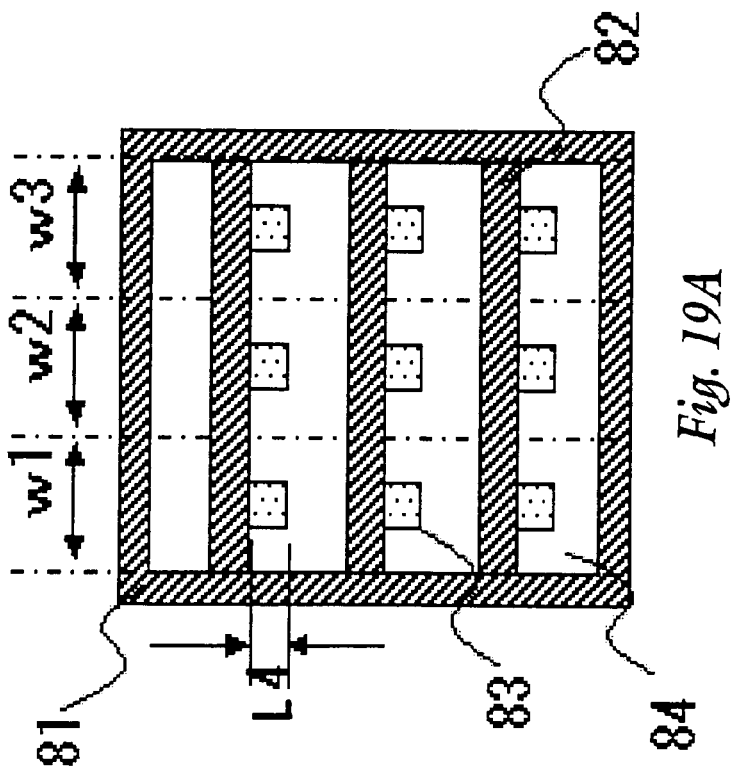

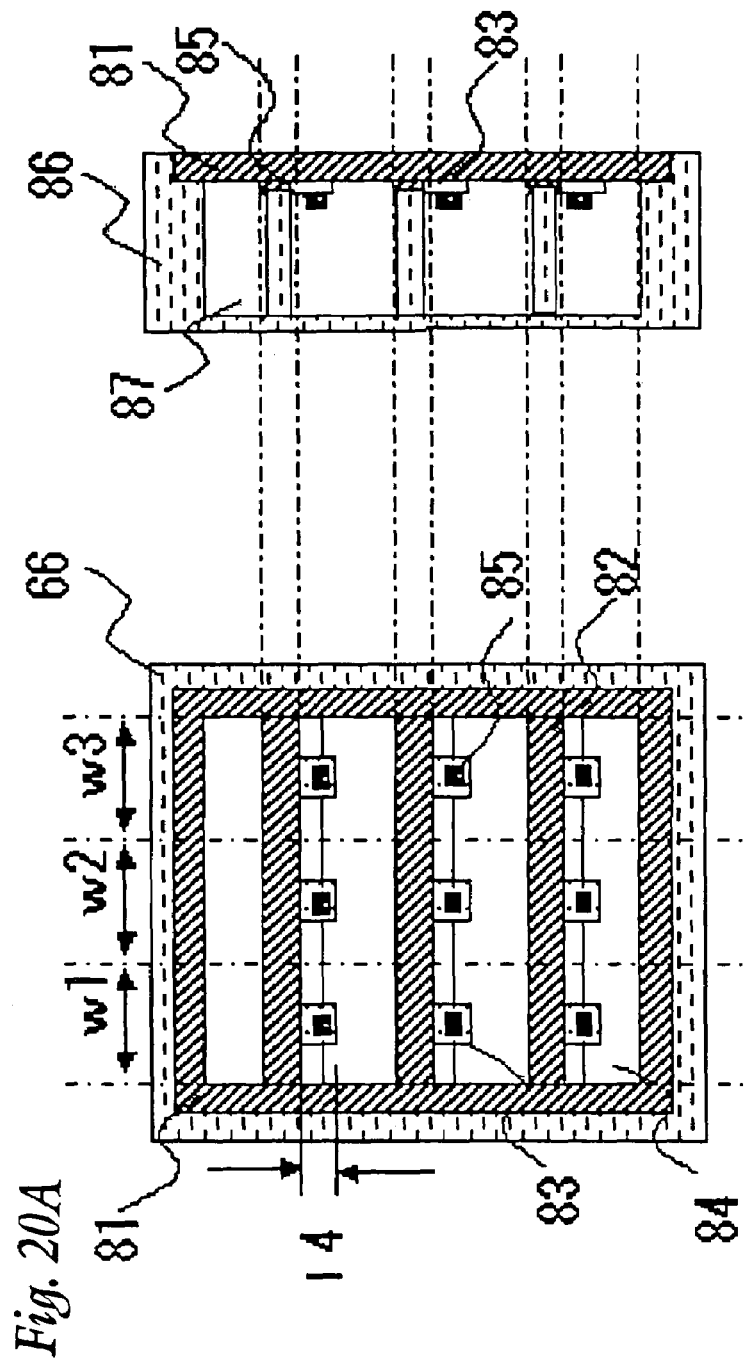
Fig. 20A
Fig. 20B
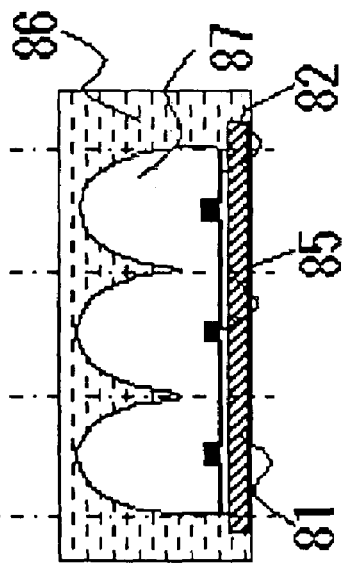
Fig. 20C

ILLUMINATION DEVICE FOR FLAT-PANEL DISPLAY AND LIGHT-EMITTING LAMP

This application claims priority to JP Application No. 2003-183629, filed 26 Jun. 2003 and JP Application No. 2004-108202 filed 31 Mar. 2004. The entire contents of these applications are incorporated herein by reference.

BACKGROUND OF THE INVENTION

1. Field of the Invention

The present invention relates to a light-emitting lamp using a light-emitting device and an illumination device using the same, and more particularly to an illumination device for a liquid crystal display device.

2. Description of the Prior Arts

A light-emitting diode (LED) that is a semiconductor light-emitting device has been used as a light source for various illumination devices or display devices. It is roughly classified into a lamp-type LED frequently used for a popular electronic equipment and having a cannonball-shaped emitting surface and a chip-type LED frequently used for an illumination device of a liquid crystal display device.

This chip-type LED has high luminous efficiency, reduced power consumption and high durability, so that it has been used as a light source for a backlight that is an illumination device of a transmissive-type liquid crystal display device or a light source for a frontlight that is an illumination device of a reflective-type liquid crystal display device.

In the aforesaid backlight, light emitted from an LED light source arranged on an edge surface (irradiated surface) of a light-guiding plate is transmitted through the light-guiding plate, and then, emitted from an emitting surface, that is the upper surface of the light-guiding plate, due to the action of the shape of the light-guiding plate. There is a need to emit light from the light-guiding plate by using the LED light source, that is a point light source, as a surface light source. Therefore, frequently used techniques for scattering light to eliminate non-uniform brightness on the emitting surface of the light-guiding plate include forming a diffusion pattern on the front or back surfaces of the light-guiding plate or disposing a diffusion sheet at the side of the emitting surface (upper surface) of the light-guiding plate.

Further, the light emitted from the light-guiding plate having the diffusion sheet formed thereon or from the diffusion sheet via the light-guiding plate is emitted in such a manner of spreading in frontward all directions. Therefore, the product under the trade name BEF manufactured by 3M Co., Ltd., for example, is disposed as a condensing prism film. This condensing prism film enhances an efficiency of a backlight by combining two principles of refraction and reflection. The light emitted from the backlight is condensed at a view angle up to 70 degrees, while the light outside of the view angle is reflected again to be recycled in the backlight system, thereby being condensed in a direction of a display user at an optimum angle.

Moreover, the product under the trade name D-BEF manufactured by 3M Co., Ltd. is disposed as a reflective-type deflection film, whereby the emitted light is selectively reflected without being absorbed by a polarizing plate below a liquid crystal panel. Consequently, the emitted light is reused over a whole view angle of the liquid crystal panel, thereby enhancing brightness in the front direction.

However, arranging the condensing prism film, reflective-type deflection film or diffusion sheet at the side of the emitting surface of the light-guiding plate increases a thickness of the backlight unit, thereby entailing a problem of increasing cost. Further, a backlight that has recently been proposed, like a technique disclosed in the patent document 1 or in the non-patent document 1, in which polarization of emitted light is aligned, has a problem of not sufficiently achieving the original object for aligning the polarization of light emitted from the light-guiding plate, since the polarization of the emitted light is confused due to the birefringence or the action of reflection and refraction of the condensing prism film or the diffusion sheet.

(Patent Document 1) U.S. Pat. No. 5,764,322
(Non-Patent Document 1) SIDO2 DIGEST P1236 to P1239

Further, the above-mentioned LED light sources may sometimes be arranged to have a predetermined space with a display area 21 as shown in FIG. 22. This is because dark sections 32 are formed between the LED light sources 31. Therefore, a dead area 33 of several millimeters is formed between the emitting surfaces of the LED light sources 31 and the display area 21 for preventing that the dark sections are formed on the irradiating area of the liquid panel. The dead area 33 is required to be formed as described above, whereby the size of the backlight increases by this area.

Moreover, in the conventional chip-type LED, there exists light that is incident on the emitting surface with an angle during when light is guided in the lamp body made of resin to reach the emitting surface. The light reaching the emitting surface is refracted and reflected based upon the Snell's low, whereby a part of the light reaching the emitting surface is reflected on the emitting surface to be transmitted again through the lamp body. Therefore, the light is reduced during the aforesaid repeated reflection, resulting in producing light that is not emitted. Accordingly, the conventional chip-type LED has a problem of low light take-out efficiency as an LED light source.

On the other hand, in the frontlight, the illumination device is arranged between the reflective-type liquid crystal panel and a display user, so that it is impossible to form a diffusion pattern, as formed in the backlight, on the light-guiding plate or to dispose a diffusion sheet. It is, therefore, difficult to eliminate non-uniform brightness of the light source. Accordingly, the light incident on the light-guiding plate is required to have uniform distribution in advance from the edge surface of the light-guiding plate. Therefore, a linear light-guiding member is arranged at the edge surface of the light-guiding plate and the LED light source is arranged at the edge surface of the linear light-guiding member.

This linear light-guiding member 35 is, as shown in FIG. 23, for introducing uniform light on a light-guiding plate 20 by using an LED light source 34, that is a point light source, as a linear light source. The back surface of the linear light-guiding member 35 has a prism structure for efficiently introducing light on the light-guiding plate 20 from the LED light source 34. Further, a reflector (not shown) is arranged at its outer periphery for efficiently combining light to the light-guiding plate 20. The arrangement of this linear light-guiding member 35 allows the light incident on the linear light-guiding member 35 from the LED light source 34 to transmit through the linear light-guiding member 35, whereby approximately uniform light is emitted toward the light-guiding plate 20. As a result, light having approximately uniform distribution can be emitted toward the liquid crystal panel 36 from the light-guiding plate 20 without using the diffusion sheet.

The light emitted from the LED light source 34 is impinged on the light-guiding plate 20 via the linear light-guiding member 35, so that it is reduced during the transmission through the linear light-guiding member 35, and hence, the light incident on the light-guiding plate 20 from the linear light-guiding member 35 becomes approximately a half of the light emitted from the LED light source 34.

If the cannonball-shaped lamp-type LED frequently used for popular electronic equipment is used for the illumination device of the liquid crystal display device, the light emitted from the LED light source is not efficiently incident on the light-guiding plate, since the emitting surface has a convex shape. Further, the shape of the irradiated surface of the light-guiding plate and the shape of the emitting surface of the LED light source do not agree with each other, thereby entailing a problem of deteriorating light incident efficiency on the light-guiding plate.

Further, among these types of LEDs, those disclosed in the patent documents 2, 3 and 4 described below have been well-known as those wherein light emitted from the emitting surface becomes approximately parallel.
(Patent Document 2) Japanese Unexamined Patent Application No. H10-335706
(Patent Document 3) Japanese Unexamined Patent Application No. 2002-134793
(Patent Document 4) Japanese Unexamined Patent Application No. H07-211940

Each of LEDs disclosed in the patent documents (patent documents 2 and 3) has a hemisphere-shaped reflection surface such that light emitted from a light-emitting surface of a light-emitting device is made approximately parallel with the reflection surface. Therefore, the LED disclosed in the aforesaid patent documents has a circular-shaped emitting surface seen from the front (seen from the irradiated surface) If this is used for the illumination device of the liquid crystal display device, the shape of the edge surface of the light-guiding plate and the shape of the emitting surface of the LED light source do not agree with each other, thereby entailing a problem of deteriorating light incident efficiency on the light-guiding plate.

Moreover, in case where the plane light-emitting type LED disclosed in the patent document 4 is used for the illumination device of the liquid crystal display device, light is not emitted from an electrode section to which the LED is mounted or from an electrode section that connects the LED and an external electrode. Therefore, if it is used for a light-emitting lamp of the illumination device, dark lines are observed in a line or in a band, thereby entailing a problem of remarkably deteriorating display quality.

Further, light is not emitted from the electrode area formed for establishing external electrical connection, thereby entailing a problem of reducing quantity of light.

SUMMARY OF THE INVENTION

The present invention aims to provide an illumination device for a flat panel display and a light-emitting lamp that enhances an efficiency of use of light by controlling the emitting direction of the emitted light and that can downsize the entire device if it is used as an illumination device of a flat panel display.

The present invention is accomplished to solve the above-mentioned subjects, and aims to provide an illumination device for a flat panel display provided with a light-guiding member for guiding light from a light-emitting lamp, wherein the light-emitting lamp has a light-emitting device incorporated in a lamp body, wherein the lamp body has a reflection surface that reflects light from the light-emitting device and an emitting surface that is opposite to the reflection surface and irradiates the reflected light from the reflection surface toward the light-guiding member, wherein the emitting surface is formed to have a shape along the irradiated surface of the light-guiding member and the reflection surface is formed to be curved such that the reflected light becomes approximately parallel seen from one direction upon reflecting light from the light-emitting device.

In the illumination device for a flat panel display having the above-mentioned construction according to the present invention, the light emitted from the light-emitting device is reflected by the reflection surface, that is formed to be curved, so as to be made approximately parallel seen from one direction. The light that is made approximately parallel is emitted from the emitting surface and incident on the irradiated surface of the light-guiding member. Since the light incident on the light-guiding member is made approximately parallel seen from one direction as described above, a condensing prism film, reflective-type deflecting film or diffusion sheet, those of which are used in a conventional backlight, is not necessarily required, that contributes to provide a thin-sized illumination device.

A light-emitting lamp according to the present invention is the one for irradiating light to a subject to be irradiated such as a light-guiding member, comprising a lamp body having a light-emitting device incorporated therein, wherein the lamp body has a reflection surface that reflects light from the light-emitting device and an emitting surface that is opposite to the reflection surface and irradiates the reflected light from the reflection surface toward the subject to be irradiated, wherein the emitting surface is formed to have a shape along the irradiated surface of the subject to be irradiated and the reflection surface is formed to be curved such that the reflected light becomes approximately parallel seen from one direction upon reflecting light from the light-emitting device.

In the light-emitting lamp having the above-mentioned construction according to the present invention, the light emitted from the light-emitting device is reflected by the reflection surface, that is formed to be curved, so as to be made approximately parallel seen from one direction. The light that is made approximately parallel can be emitted from the emitting surface. Therefore, in case where this light-emitting lamp is applied to a flat panel display having a light-guiding member, the light incident on the light-guiding member is made approximately parallel seen from one direction. Accordingly, a condensing prism film, reflective-type deflecting film or diffusion sheet, those of which are used in a conventional backlight, is not necessarily required, that contributes to provide a thin-sized illumination device. Moreover, the emitting surface of the lamp body is formed into a shape along the irradiated surface of the light-guiding member, so that the thickness of the light-emitting lamp and the thickness of the subject to be irradiated match to each other, i.e., both shapes can be agreed with each other.

Further, it is preferable to apply a construction in the present invention wherein the emitting surface is formed to have an approximately rectangular shape seen from the irradiated surface. This can bring an advantage of further matching with the shape of the light-guiding member.

Moreover, it is preferable in the present invention that the emitting surface is divided into an irradiation section that transmits the light reflected by the reflection surface and irradiates toward a subject to be irradiated, a first electrode section on which the light-emitting device is formed and a second electrode section for electrically connecting the light-emitting device and an external power source, wherein the length of an area, in the direction of the thickness of the light-emitting lamp, where the second electrode section is overlapped with the irradiated surface of the light-guiding member is formed to be not more than 0.2 mm.

This allows to transmit sufficient light without lowering quantity of light that transmits from the irradiation section formed on the emitting surface, thereby being capable of providing a bright illumination device and light-emitting lamp.

In general, a non-transparent substrate such as glass-epoxy is used for the second electrode, on which a metal electrode is formed in the conventional light-emitting lamp. In the light-emitting lamp described above using the non-transparent substrate, light is not emitted from the non-transparent area, so that the quantity of transparent light is reduced. In case where it is used for a light-emitting lamp in the illumination device, in particular, light is not emitted from an area where the non-transparent area and the irradiated surface of the light-guiding member overlap with each other. Therefore, band-shaped dark lines are observed, thereby entailing a problem of deteriorating display quality. However, the occurrence of band-shaped dark lines can be prevented by making the length of the area in the thickness direction of the light-emitting lamp, where the non-transparent area and the irradiated surface of the light-guiding member overlap with each other, not more than 0.2 mm.

Further, it is preferable to adopt a construction in which the emitting surface is divided into an irradiation section that transmits the light reflected by the reflection surface and irradiates toward a subject to be irradiated, a first electrode section on which the light-emitting device is formed and a second electrode section for electrically connecting the light-emitting device and an external power source, wherein the population of the first electrode section in the irradiated area on the emitting surface in the direction of the thickness of the light-emitting lamp is formed to be not more than 70%.

This can decrease the dark area where light is not emitted from the emitting surface. In case where it is used as an illumination device, in particular, an illumination device and light-emitting lamp can be provided in which dark lines, that means the dark section is observed in a line, are decreased.

Moreover, the light-emitting device is arranged to be shifted in either the upward direction or downward direction from the center of the thickness direction of the reflection surface, thereby being capable of providing an illumination device and a light-emitting lamp in which dark lines are decreased and the reduction in the quantity of light is prevented.

Further, a glass substrate, transparent resin substrate (for example, PMMA, PC) or the like is arranged on the emitting surface, or a transparent material (ITO or the like) is used for an electrode that electrically connects the light-emitting device and an external power source, thereby being capable of further improving the reduction in the quantity of light emitted from the emitting surface and providing an illumination device and a light-emitting lamp in which the occurrence of band-shaped dark lines are prevented.

Further, the present invention preferably adopts a construction wherein the reflection surface is formed to be a curved surface having a focal point on the light-emitting surface of the light-emitting device or in the vicinity thereof. This brings an advantage that the light reflected by the reflection surface is made closer to be parallel seen from one direction.

Additionally, the lamp body preferably has an upper surface and/or lower surface formed into an approximately plane in the present invention. By this construction, light having a predetermined angle, among lights reaching the upper surface or the lower surface, is reflected in the lamp body by the approximately plane upper and lower surfaces, so that it can be used as the emitted light from the emitting surface. Therefore, there is an advantage of enhancing the efficiency of use of light. Moreover, the upper surface and/or lower surface of the lamp body is preferably formed so as to communicate to the upper surface and the lower surface of the subject to be irradiated such as the light-guiding member. By this construction, the upper surface and the lower surface of the lamp body are positioned to communicate to the upper surface and the lower surface of the subject to be irradiated such as the light-guiding member, that contributes to miniaturize the entire device, thereby providing an advantage of further increasing the efficiency of use of light due to the agreement with the shape of the irradiated surface.

Moreover, in case where the lamp body has the upper surface and the lower surface as described above, a reflection layer is preferably formed on at least one of the upper surface and the lower surface of the lamp body. By this construction, among lights emitted from the emitting surface of the light-emitting device, the light emitted from the upper surface and the lower surface is reflected in the lamp body by the reflection layer to thereby be utilized as the emitted light from the emitting surface. Therefore, there is an advantage of further enhancing the efficiency of use of light.

Further, the light-emitting device is preferably an LED in the present invention. This enables to use the light-emitting lamp of the present invention as a solid device illumination light source that is safe and environmentally friendly having reduced power consumption and long service life.

Moreover, diffusion means is preferably provided on the emitting surface in the present invention. By this construction, even the light that satisfies the total reflection condition in the case of the flat emitting surface breaks the total reflection condition due to the formation of the diffusion means on the emitting surface, thereby being capable of reducing reflectivity on the emitting surface. Accordingly, the efficiency of use of light can be enhanced. Specifically, the reflected light from the reflection surface is made approximately parallel seen from one direction, but it is not approximately parallel in the direction perpendicular to this direction. Therefore, light can be emitted from the emitting surface due to the formation of the diffusion means on the emitting surface even if the angle seen from this perpendicular direction satisfies the total reflection condition.

Further, the diffusion means can be made of a fluorescent material formed on the emitting surface. The total reflection condition can be broken by the fluorescent material formed on the emitting surface.

Additionally, the diffusion means can be formed by at least one concave/convex surface. The light incident angle is changed on the interface of the concave/convex surface, thereby similarly being capable of breaking the total reflection condition.

Further, this concave/convex surface is preferably arranged one-dimensionally. This can maintain parallelism seen from one direction to some degree. The concave/convex surface is preferably composed of plural convex members formed along the direction perpendicular to the direction in which the reflected light can be seen as parallel. This can enhance the parallelism of the emitted light seen from one direction, although the diffusion means is provided.

Moreover, plural lamp bodies are preferably arranged in an illumination device for a flat panel display according to the present invention. This construction can uniformly supply light all over the light-guiding member, thereby being capable of eliminating a conventional dead area (see FIG. 22). Therefore, the area of the device to the display area can be reduced.

Additionally, when the above-mentioned construction is applied, the plural lamp bodies are preferably integrally formed, whereby light can totally be irradiated like a line light source. It should be noted that plural lamp bodies are preferably integrally formed even in a light-emitting lamp according to the present invention.

As described above, according to the present invention, the reflection surface is formed to be curved, whereby light from the light-emitting device is reflected from the reflection surface so as to be made approximately parallel seen from one direction. The light that is made approximately parallel is emitted from the emitting surface. Therefore, the condensing prism film, reflective-type deflecting film or diffusion sheet that is used in the conventional backlight is not necessarily required, and the dead area that is conventionally required is unnecessary, that can contribute to miniaturize the entire device. Further, the emitting surface is formed into a shape along the irradiated surface, thereby being capable of efficiently irradiating light from the light-emitting device to the irradiated surface, resulting in providing an advantage of enhancing the efficiency of use of light.

BRIEF DESCRIPTION OF THE DRAWINGS

FIG. 7A and FIG. 7B are explanatory views for explaining the function of the light-emitting lamp in the third embodiment, wherein FIG. 7A is a schematic side view of the light-emitting lamp of the first embodiment in the vicinity of the emitting surface and FIG. 7B is a schematic side view of the light-emitting lamp of the third embodiment in the vicinity of the emitting surface;

FIG. 8A and FIG. 8B are explanatory views of a light-emitting lamp in a fourth embodiment, wherein FIG. 8A is a schematic perspective view and FIG. 8B is a schematic plan view.

FIG. 9A and FIG. 9B are explanatory views of a light-emitting lamp in a fifth embodiment, wherein FIG. 9A is a schematic plan view and FIG. 9B is a schematic perspective view for explaining a relationship between the light-emitting lamp and a light-guiding member when it is mounted to a flat panel display;

FIG. 10A and FIG. 10B are schematic explanatory views of a light-emitting lamp according to a sixth embodiment, wherein FIG. 10A is a schematic perspective view and FIG. 10B is a schematic front view;

FIG. 12 is a table relating to the light-emitting lamp in the sixth embodiment and a band-shaped dark line;

FIG. 14 is a table relating to the light-emitting lamp in the sixth embodiment and a line-shaped dark line;

FIG. 15A and FIG. 15B are schematic views showing a manufacturing method of the light-emitting lamp of the sixth embodiment;

FIG. 16A, FIG. 16B, and FIG. 16C are schematic views showing a manufacturing method of the light-emitting lamp of the sixth embodiment;

FIG. 18A and FIG. 18B are schematic explanatory views of a light-emitting lamp in a seventh embodiment, wherein FIG. 18A is a schematic perspective view and FIG. 18B is a schematic front view;

FIG. 19A and FIG. 19B are schematic views showing a manufacturing method of the light-emitting lamp of the seventh embodiment;

FIG. 20A and FIG. 20B are schematic views showing a manufacturing method of the light-emitting lamp of the seventh embodiment;

DESCRIPTION OF THE PREFERRED EMBODIMENTS

Embodiments of the present invention will be explained hereinbelow.

Embodiment 1

Figure 1:
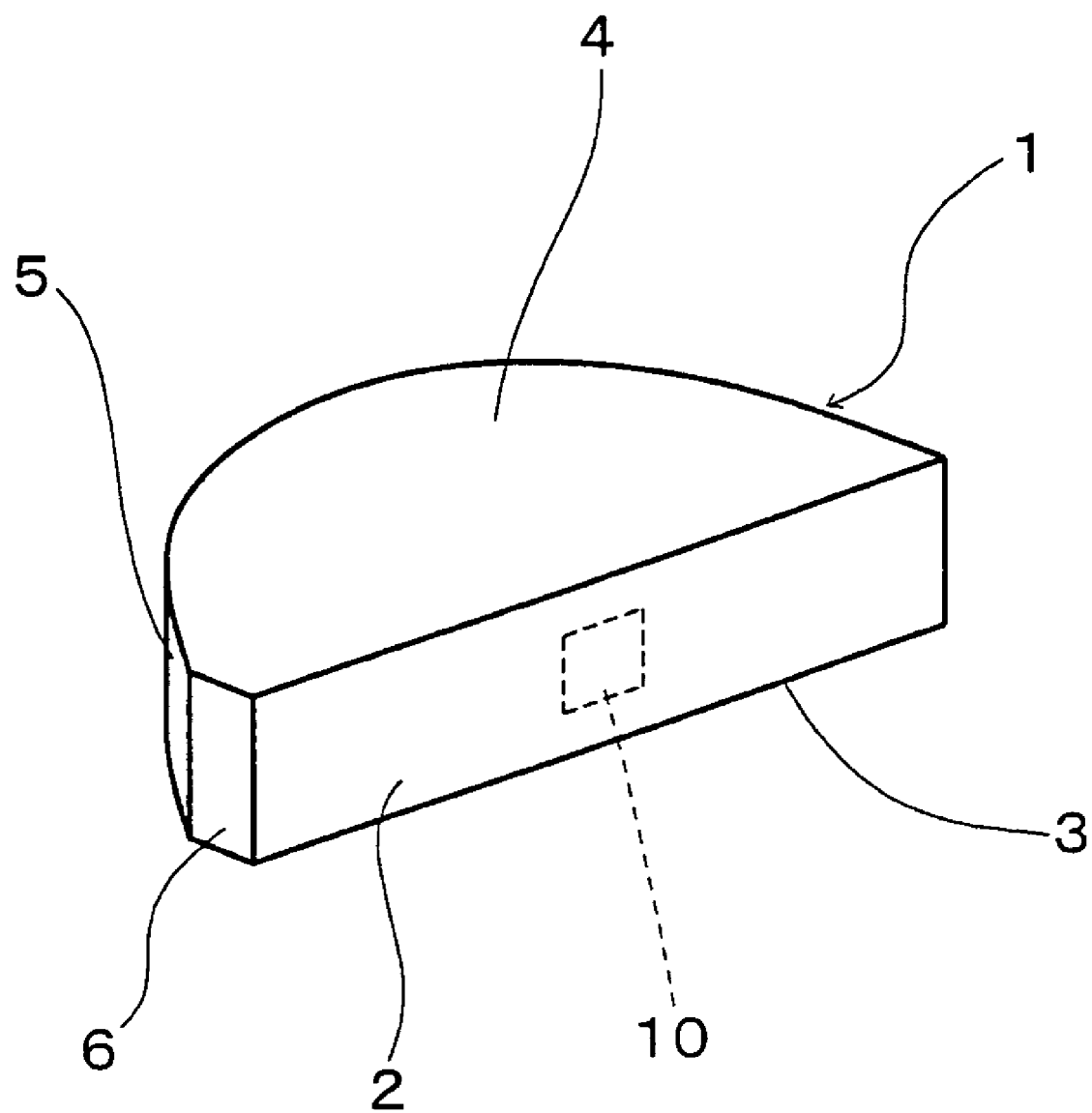
FIG. 1 is a schematic perspective view of a light-emitting lamp according to a first embodiment.
Figure 2:
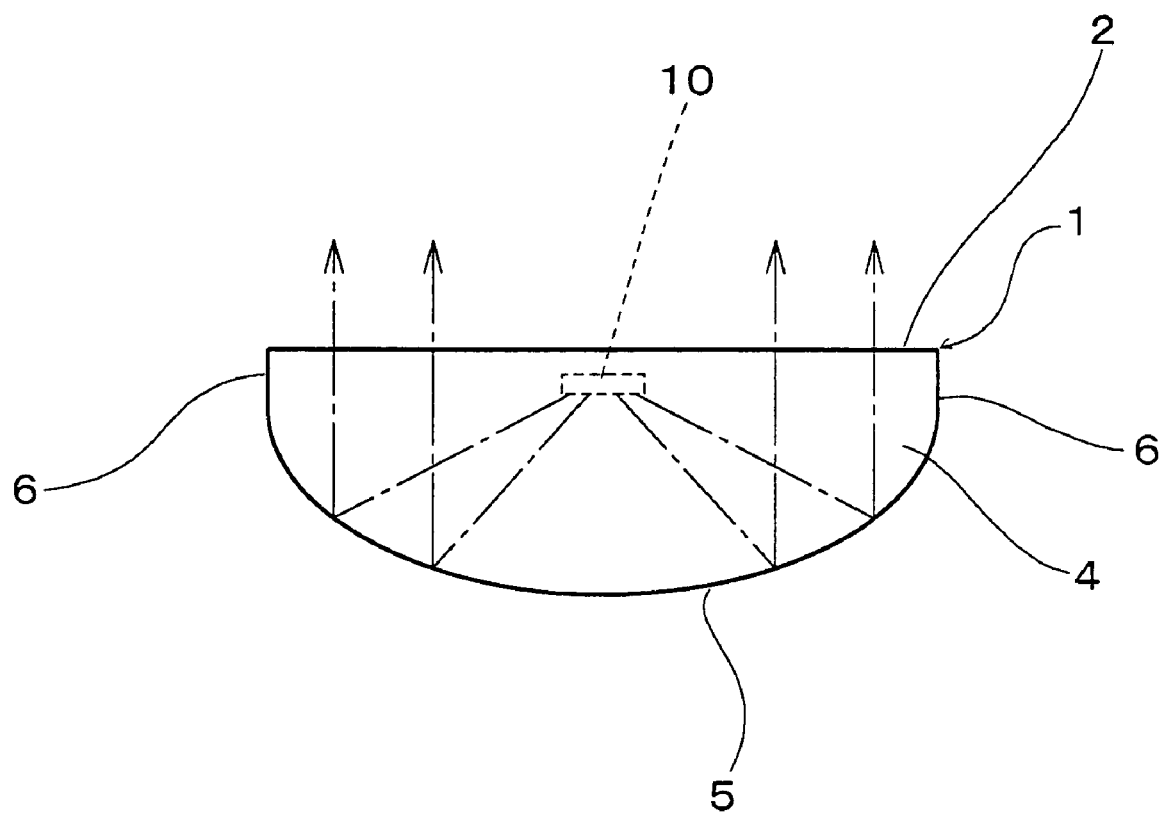
FIG. 2 is a schematic plan view of the light-emitting lamp according to the first embodiment.
Figure 3:
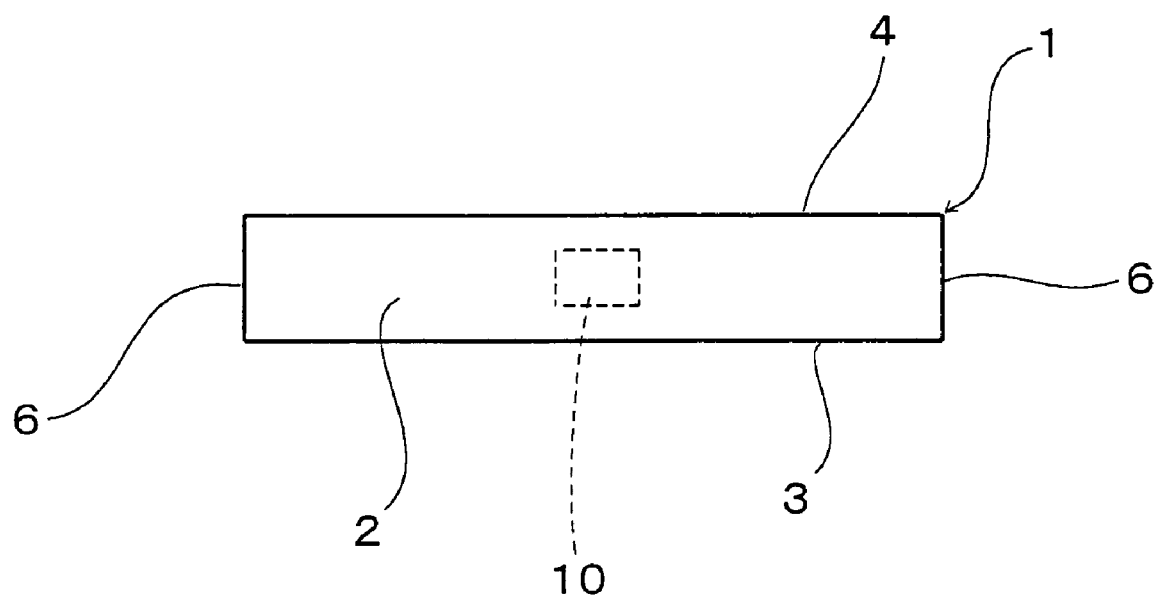
FIG. 3 is a schematic front view of the light-emitting lamp according to the first embodiment.
Figure 4:
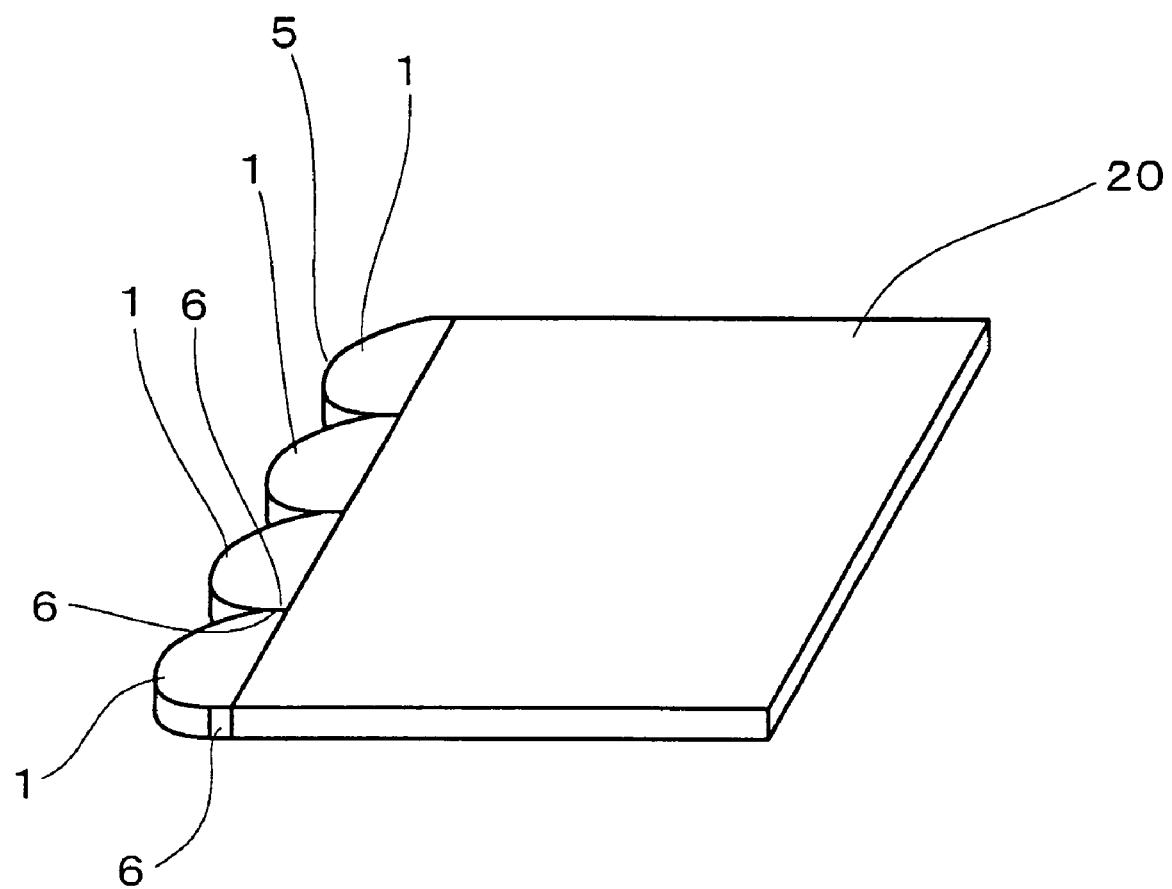
FIG. 4 is a schematic perspective view for explaining a relationship between the light-emitting lamp and a light-guiding member when the light-emitting lamp of the first embodiment is mounted to a flat panel display.

Firstly, a light-emitting lamp used in an illumination device of a flat panel display according to the first embodiment of the present invention will be explained with reference to FIGS. 1 to 4. FIG. 1 is a schematic perspective view of a light-emitting lamp according to the first embodiment. Further, FIG. 2 is a schematic plan view of the light-emitting lamp according to the first embodiment. Moreover, FIG. 3 is a schematic front view of the light-emitting lamp according to the first embodiment. Moreover, FIG. 4 is a schematic perspective view for explaining a relationship between the light-emitting lamp and a light-guiding member when the light-emitting lamp of the first embodiment is mounted to a flat panel display. The size, material, shape, its relative arrangement or the like of the components disclosed in this embodiment are not construed to limit the scope of the invention to the disclosed ones, but they are given solely for the purpose of illustration, so long as specific descriptions are not given.

The light-emitting lamp in the first embodiment has a construction wherein a lamp body 1 made of a resin has a light-emitting device 10 incorporated therein. The light-emitting device 10 is composed of a light-emitting diode (LED) that emits light by electrical power from a substrate (not shown) to which the light-emitting lamp is electrically connected with a soldering or the like. The light-emitting lamp 10 is disposed so as to emit light toward the back side (toward a reflection surface 5 described later).

Further, the light-emitting device 10 is incorporated in the lamp body 1 by being incorporated in a forming die upon forming the lamp body 1 with a molding resin. Moreover, a fluorescent material is applied on the light-emitting surface of the light-emitting diode 10, whereby light emitted from the light-emitting surface of the light-emitting device 10 is whitened.

The lamp body 1 is formed to have a rectangular shape seen from the front (seen from the irradiated surface) This front side is defined as an emitting surface 2 that emits light toward the light-guiding member 20. Specifically, the emitting surface 2 is formed to have a shape along the irradiated surface (edge surface) of the light-guiding member 20 that is a subject to be irradiated. It should be noted that the emitting surface 2 is formed to be plane in this embodiment.

The lamp body 1 has a lower surface 3 placed on a substrate to be connected thereto and an upper surface 4 opposite to the lower surface 3, both of which are plane and arranged parallel to each other. Further, the upper surface 4 and the lower surface 3 of this lamp body 1 are arranged to communicate to the upper surface and lower surface of the light-guiding member 20. It should be noted that a reflection layer (not shown) is preferably disposed on the upper surface 4 and the lower surface 3. The reflection layer can be realized by a reflection mirror attached to the lamp body 1 or by a white dye applied on the lamp body 1.

Further, the lamp body 1 is formed to have a back surface (the surface opposite to the emitting surface 2) defined as a curved reflection surface 5. The light from the light-emitting device 10 is reflected by this reflection surface 5 toward the emitting surface 2.

The reflection surface 5 is formed to be a curved surface whose focus is placed on the light-emitting surface of the light-emitting device 10 or its vicinity. By this, the light from the light-emitting device 10 is made approximately parallel seen from the plane by being reflected by the reflection surface 5. A parabolic curve, for example, can be used as a curved surface of this reflection surface 5.

Moreover, the lamp body 1 has a side surface 6 composed of a plane that is approximately perpendicular to the emitting surface 2 and communicates to the reflection surface 5.

Further, if the above-mentioned light-emitting lamp is incorporated into an illumination device (for example, a backlight) of a flat panel display, plural lamps are arranged for one light-guiding member 20 as shown in FIG. 4. These plural light-emitting lamps are arranged such that each emitting surface 2 is made proximate to each other. More specifically, it is arranged such that the side surface 6 of the lamp body 1 comes in contact with the side surface 6 of the adjacent lamp body 1.

Moreover, the light-emitting lamp is arranged such that the emitting surface 2 comes in approximately contact with the irradiated surface of the light-guiding member 20.

In the light-emitting lamp having the above-mentioned construction and the illumination device for a flat panel display to which this light-emitting lamp is incorporated, light emitted from the light-emitting device 10 is reflected by the reflection surface 5 of the lamp body 1, and then, emitted from the emitting surface 2 of the lamp body 1 toward the light-guiding member 20 to be guided in the light-guiding member 20.

Since the reflection surface 5 is formed into the curved surface seen from the plane as described above, the reflected light is made approximately parallel seen from the plane, whereupon the approximately parallelized light is guided in the light-guiding member 20. Therefore, the condensing prism film, reflective-type deflecting film or diffusion sheet that is used in the conventional backlight is not necessarily required, thereby being capable of attaining a thin-sized illumination device.

Further, although the reflected light on the reflection surface 5 is not made approximately parallel seen from the side, the light among lights reaching the upper surface 4 and the lower surface 3 of the lamp body 1 within a predetermined angle is accurately reflected toward the upper surface 4 and the lower surface 3, since the upper surface 4 and the lower surface 3 are plane. Disposing a reflection layer on the upper surface 4 and the lower surface 3 particularly brings more accurate reflection. Therefore, light from the light-emitting device 10 can efficiently be guided to the emitting surface 2.

Figure 22:
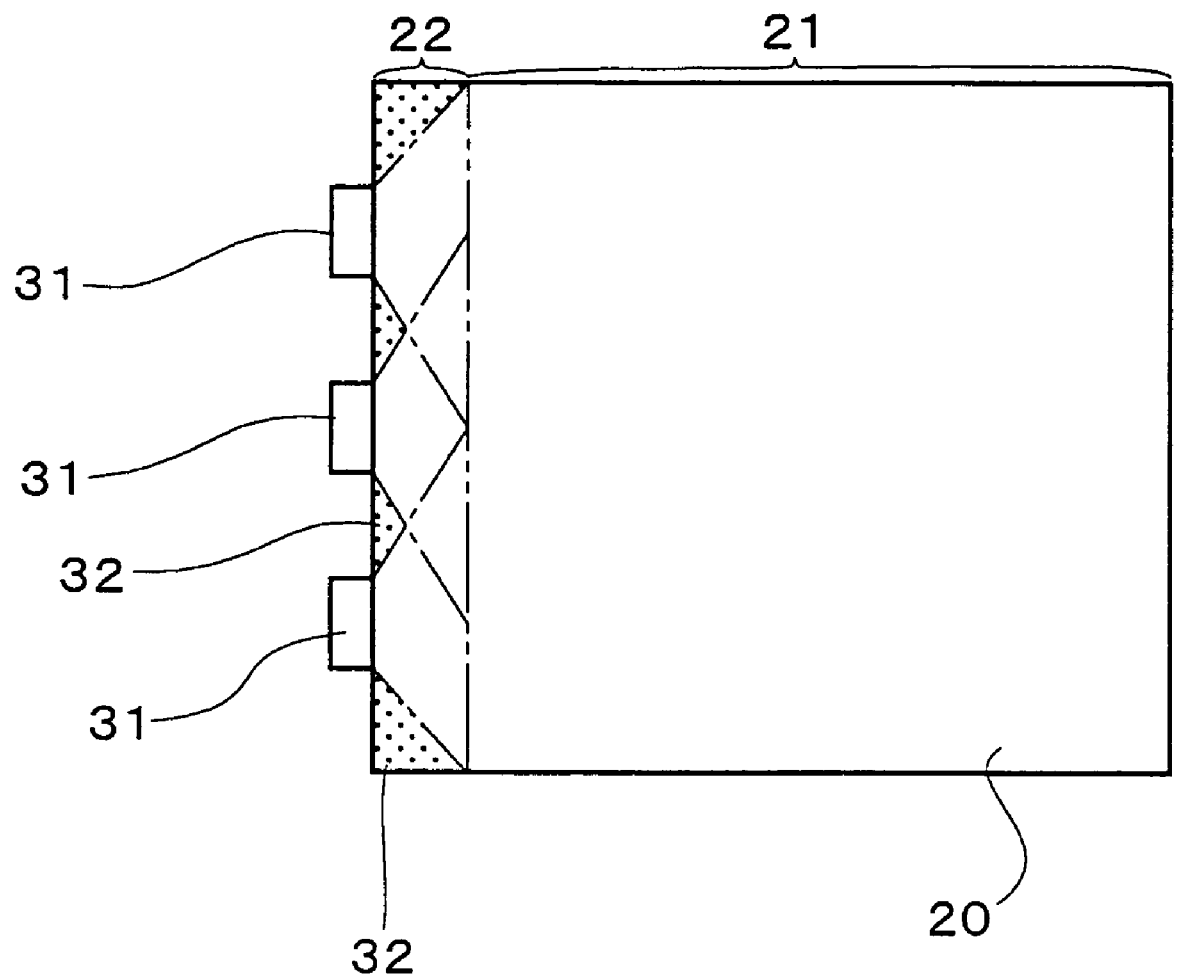
FIG. 22 is a schematic plan view of a conventional illumination device.
Figure 23:
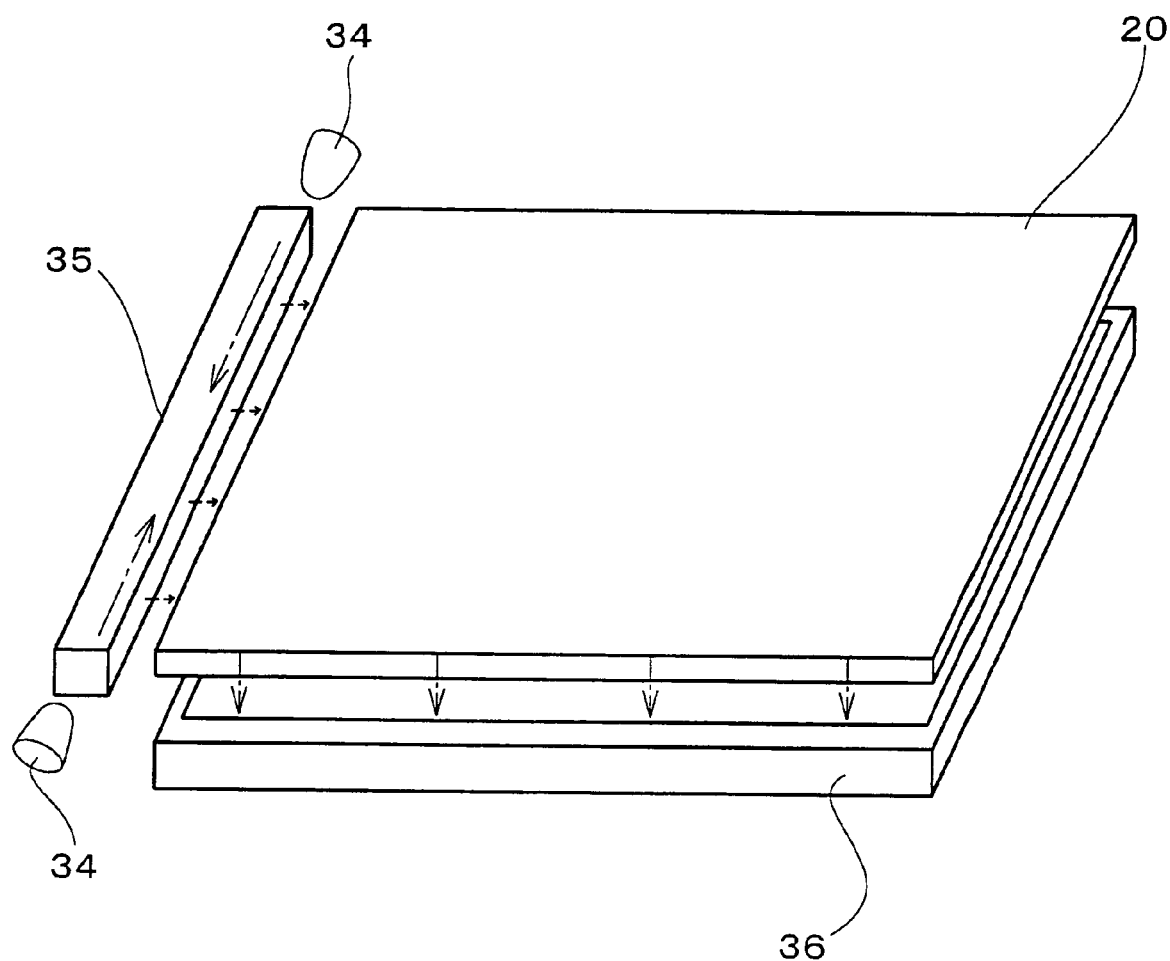
FIG. 23 is a schematic perspective view of a conventional illumination device.

Moreover, plural light-emitting lamps are arranged to one light-guiding member 20, wherein each emitting surface 2 is arranged to be proximate to each other, in particular. Therefore, this makes it possible to uniformly supply light all over the light-guiding member 20, whereby the irradiated surface of the light-guiding member 20 and the emitting surface 2 of the lamp body 1 can be arranged to nearly contact to each other, thereby eliminating a conventional dead area (see FIG. 22). Accordingly, the area of the device to the display area can be reduced, and further, a device having a design freedom in light directivity can be obtained. The above-mentioned embodiment has, in particular, an advantage of having high design freedom since the upper surface and the lower surface of the light-guiding member 20 and the upper surface 4 and the lower surface 3 of the lamp body 1 are formed to communicate to each other.

Further, an LED is used as the light-emitting device 10, thereby having an advantage of reduced power consumption and long service life.

Embodiment 2

Figure 5:
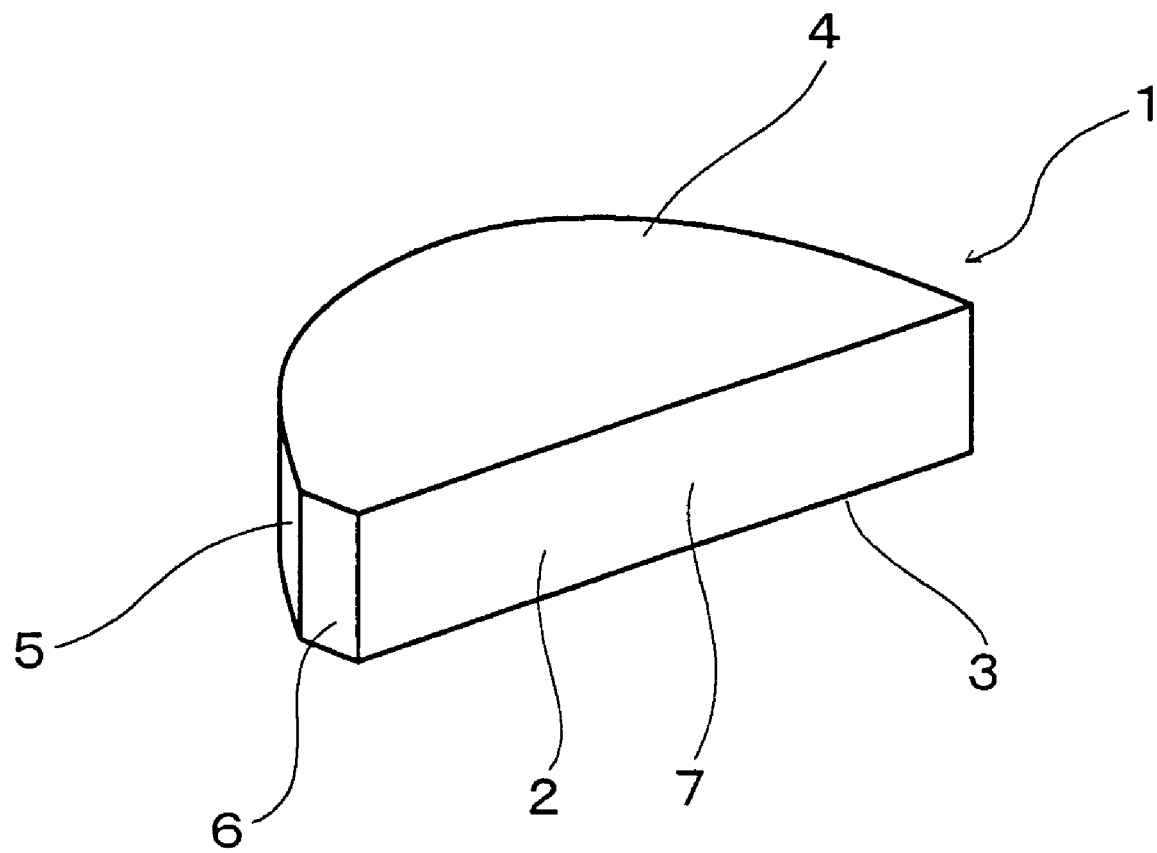
FIG. 5 is a schematic perspective view of a light-emitting lamp according to a second embodiment.

Subsequently, a light-emitting lamp according to the second embodiment of the present invention will be explained with reference to FIG. 5. FIG. 5 is a schematic perspective view of the light-emitting lamp according to the second embodiment. It should be noted that the components having the same construction and same function as those in the first embodiment are given same numerals for omitting the detailed explanation thereof.

The light-emitting lamp in the second embodiment has diffusion means 7 for restraining total reflection of light formed on the emitting surface 2 of the lamp body 1. The diffusion means 7 in this embodiment is composed of a fluorescent coating applied on the emitting surface 2.

According to the light-emitting lamp in the second embodiment, light from the light-emitting device 10 is reflected by the reflection surface 5 of the lamp body 1 to be made approximately parallel seen from the plane, and then, reaches the emitting surface 2 having the diffusion means 7. Even the light, among the lights reaching the emitting surface 2, that satisfies the total reflection condition in case where the diffusion means 7 is not provided, breaks the total reflection condition in the case of the emitting surface 2 having the diffusion means 7 formed thereon, whereby the light can be emitted from the emitting surface 2 to the irradiated surface, thereby being capable of reducing reflectivity on the emitting surface 2. Further, providing the diffusion means 7 on the emitting surface 2 enables to emit even uniform light from the emitting surface 2. The method for forming the diffusion means 7 on the emitting surface 2 includes performing a roughing process on the emitting surface 2 to thereby obtain the diffusion means 7 composed of a roughened surface, in addition to the method of applying the fluorescent coating.

Embodiment 3

Figure 6:
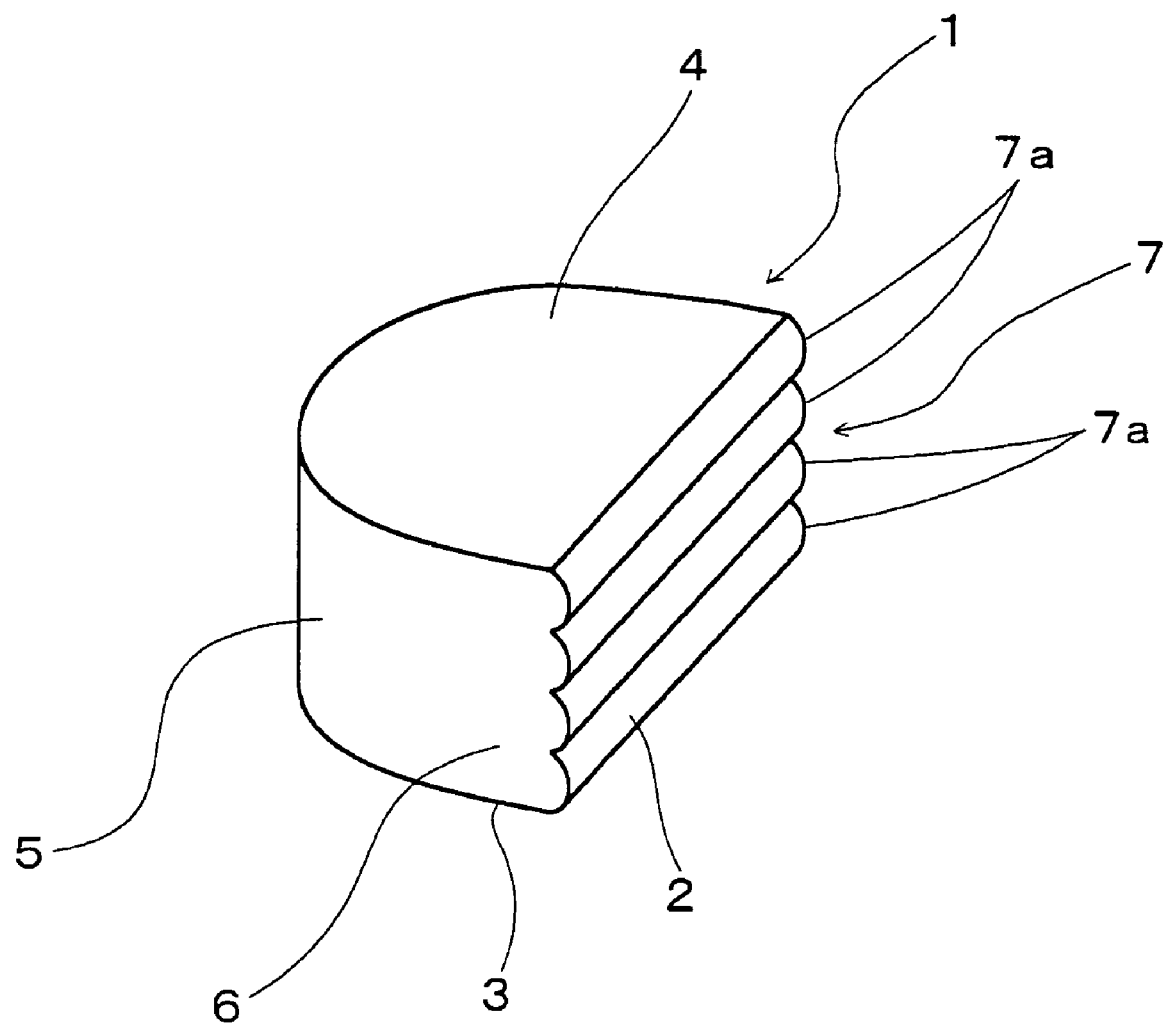
FIG. 6 is a schematic perspective view of a light-emitting lamp according to a third embodiment.
Figure 7A:
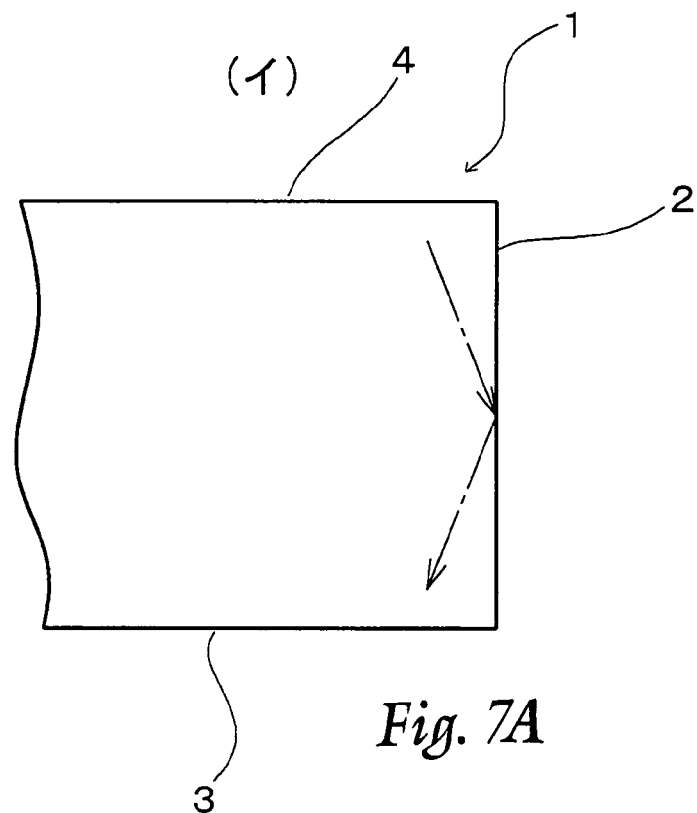
Figure 7B:
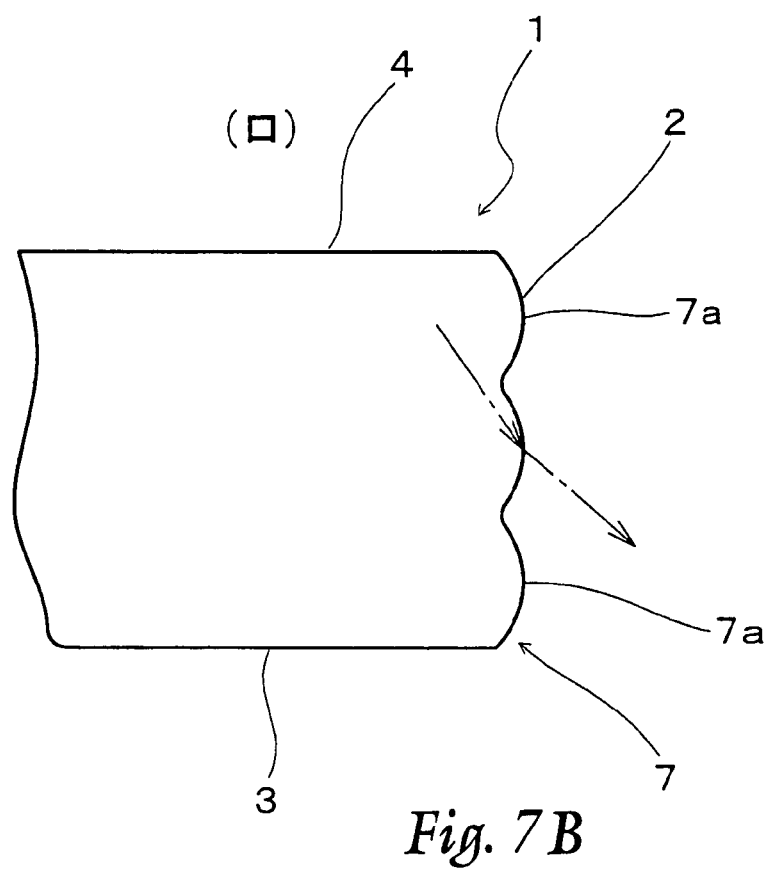

Subsequently, a light-emitting lamp according to the third embodiment of the present invention will be explained with reference to FIGS. 6 and 7. FIG. 6 is a schematic perspective view of the light-emitting lamp according to the third embodiment. Further, FIG. 7 is an explanatory view for explaining the function of the light-emitting lamp in this embodiment, wherein (a) is a schematic side view of the light-emitting lamp of the first embodiment in the vicinity of the emitting surface and (b) is a schematic side view of the light-emitting lamp of the third embodiment in the vicinity of the emitting surface. It should be noted that the components having the same construction and same function as those in the first and second embodiments are given same numerals for omitting the detailed explanation thereof.

In the light-emitting lamp according to the third embodiment, the diffusion means 7 provided on the emitting surface 2 is formed to have a concave/convex surface. This concave/convex surface is composed of plural convex members 7*a*, each of which is parallel to one another, whereby the concave/convex surface is one-dimensionally arranged. More specifically, these plural convex members 7*a* are formed so as to be parallel in the horizontal direction (upper side and lower side of the emitting surface 2). In other words, the plural convex members 7*a* are formed along the direction (horizontal direction) perpendicular to the direction (vertical direction) in which the reflected light is seen as approximately parallel.

Even the light, among the lights reaching the emitting surface 2 having the diffusion means 7 provided with the concave/convex surface (convex members 7*a*), that satisfies the total reflection condition in case where the diffusion means 7 is not provided, has a different incident angle in the case of the emitting surface 2 having the concave/convex surface (convex members 7*a*) formed thereon, thereby being capable of reducing reflectivity on the emitting surface 2.

Embodiment 4

Figure 8A:
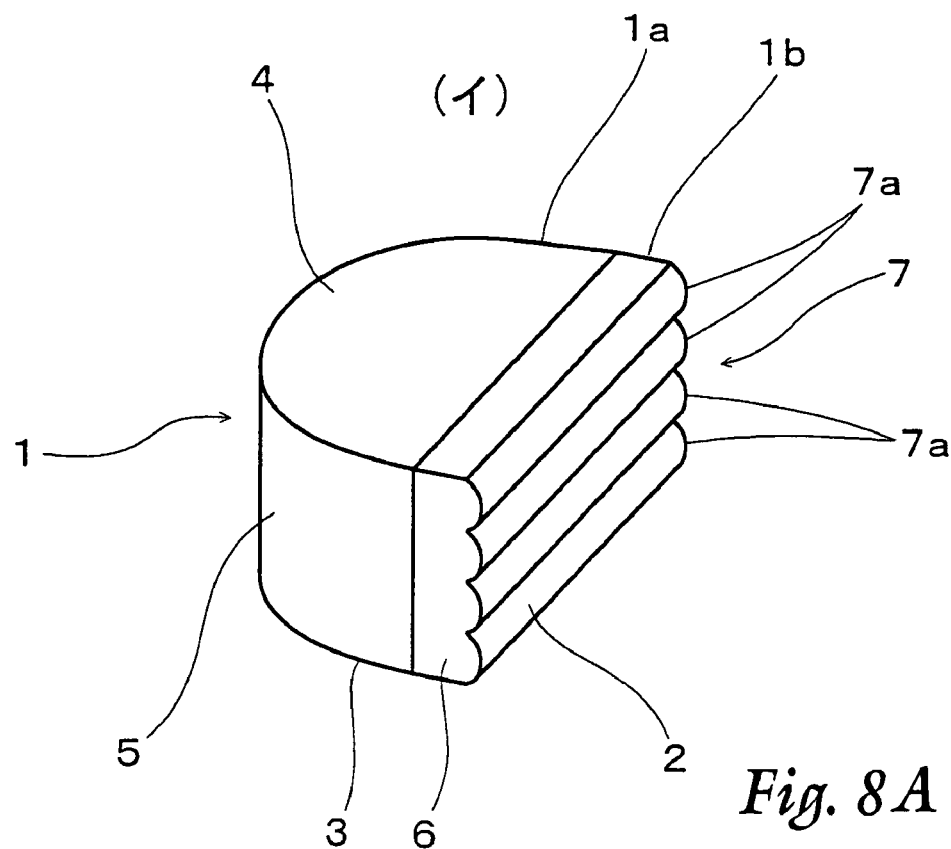
Figure 8B:
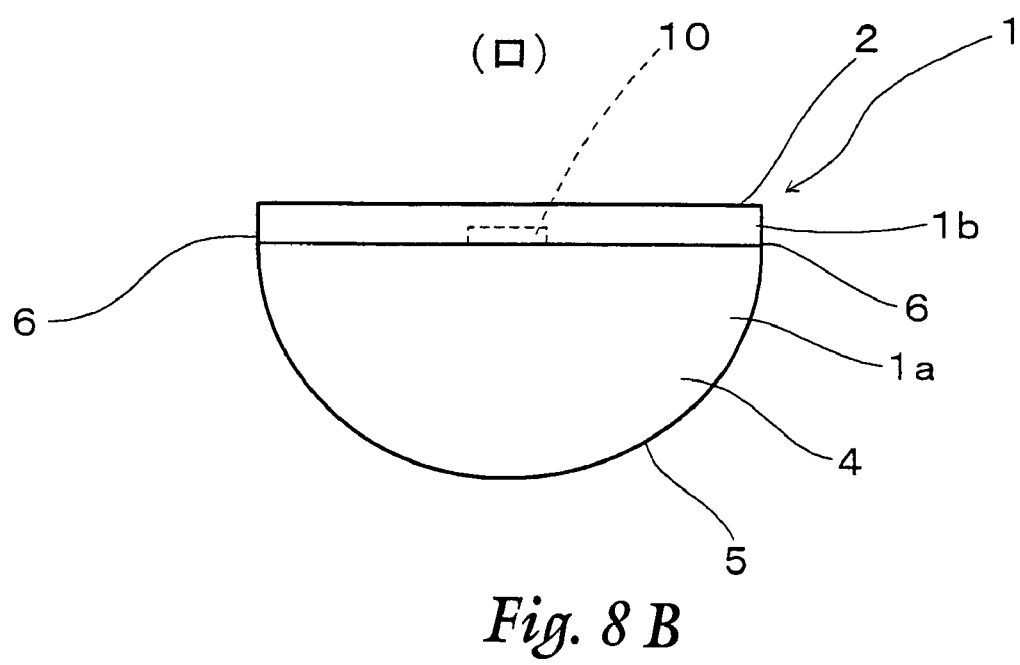

Subsequently, a light-emitting lamp according to the fourth embodiment of the present invention will be explained with reference to FIG. 8. FIG. 8 is an explanatory view of the light-emitting lamp in this embodiment, wherein (a) is a schematic perspective view and (b) is a schematic plan view. It should be noted that the components having the same construction and same function as those in the first to third embodiments are given same numerals for omitting the detailed explanation thereof.

The light-emitting lamp in the fourth embodiment has the diffusion means 7, same as that in the third embodiment, on the emitting surface 2. The lamp body 1 comprises a reflection section 1*a* having the reflection surface 5 and an emitting section 1*b* having the emitting surface 2. The reflection section 1*a* and the emitting section 1*b* are made of a different material and both sections 1*a* and 1*b* are integrally mounted to compose the lamp body 1. The reflection section 1*a* and the emitting section 1*b* are both made of a resin and integrally mounted by engaging means (not shown) provided to the respective sections. Further, a concave section (not shown) for accommodating the light-emitting device 10 is formed at the emitting section 1*b*, whereby the light-emitting device 10 is accommodated in this concave section. It should be noted that this concave section can be formed at the reflection section 1*a*, or at both of the emitting section 1*a* and the reflection section 1*b*, wherein the light-emitting device 10 can be accommodated in a space formed by the concave sections at both sections 1*a* and 1*b*.

Embodiment 5

Figure 9A:
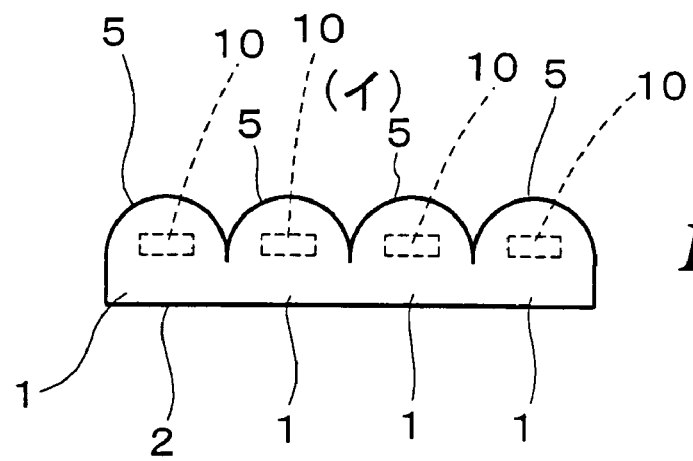
Figure 9B:
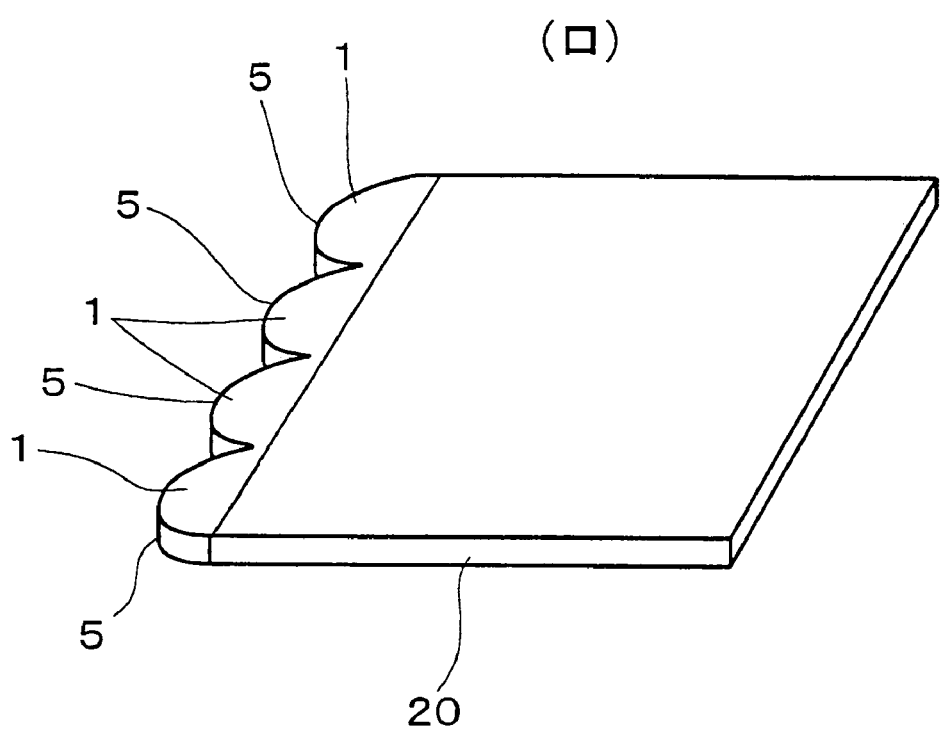

Subsequently, a light-emitting lamp according to the fifth embodiment of the present invention will be explained with reference to FIG. 9. FIG. 9 is an explanatory view of the light-emitting lamp in the fifth embodiment, wherein (a) is a schematic plan view and (b) is a schematic perspective view for explaining a relationship between the light-emitting lamp and a light-guiding member when it is mounted to a flat panel display. It should be noted that the components having the same construction and same function as those in the first to fourth embodiments are given same numerals for omitting the detailed explanation thereof.

The light-emitting lamp in the fifth embodiment is formed such that plural lamp bodies 1 having the light-emitting device 10 incorporated therein are integrally formed. Specifically, plural lamp bodies 1 having the light-emitting device 10 incorporated therein are monolithically formed by a molding resin. During this forming, the light-emitting device 10 is formed in the die of each lamp body 1, whereby the light-emitting device 10 is incorporated in each lamp body 1.

The above-mentioned light-emitting lamp is arranged at the edge surface (irradiated surface) of the light-guiding member 20, so that light can be irradiated like a line light source to the light-guiding member 20 by plural lamp bodies 1, thereby making it possible to uniformly supply light all over the light-guiding member 20. Therefore, the conventional dead area (see FIG. 22) can be eliminated, thereby being capable of reducing the area of the device to the display area. Further, the light-emitting lamp is composed such that plural lamp bodies 1 are integrally formed, thereby providing an advantage of simply performing a built-in operation of the light-emitting lamp, thus enhancing working property.

Embodiment 6

Figure 10A:
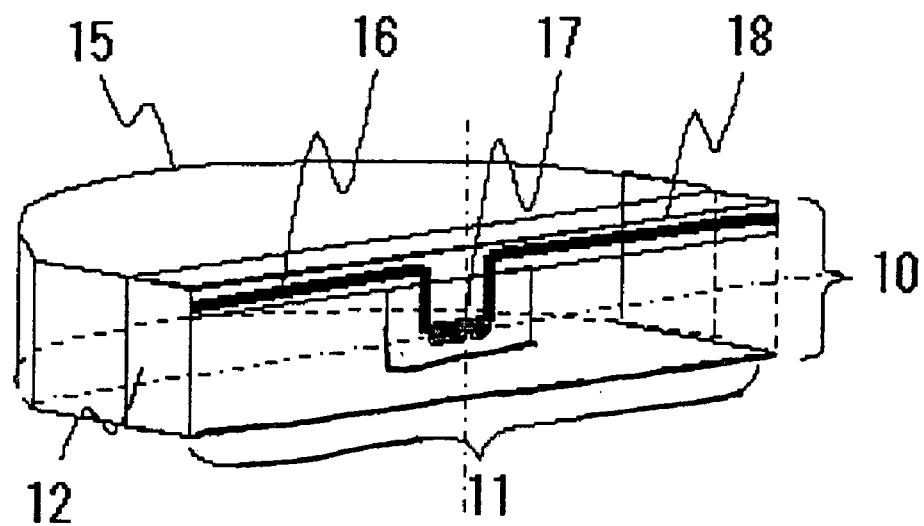
Figure 10B:
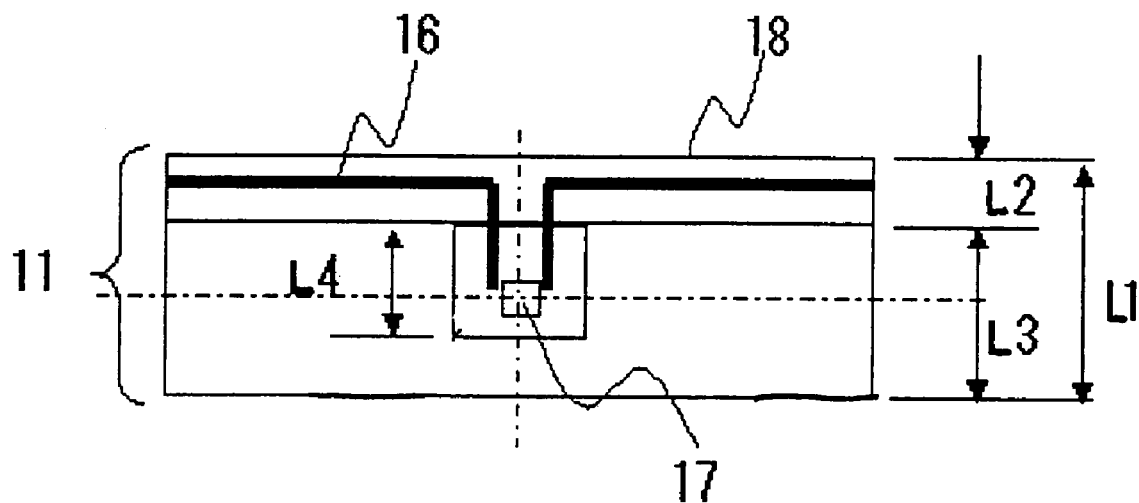
Figure 11:
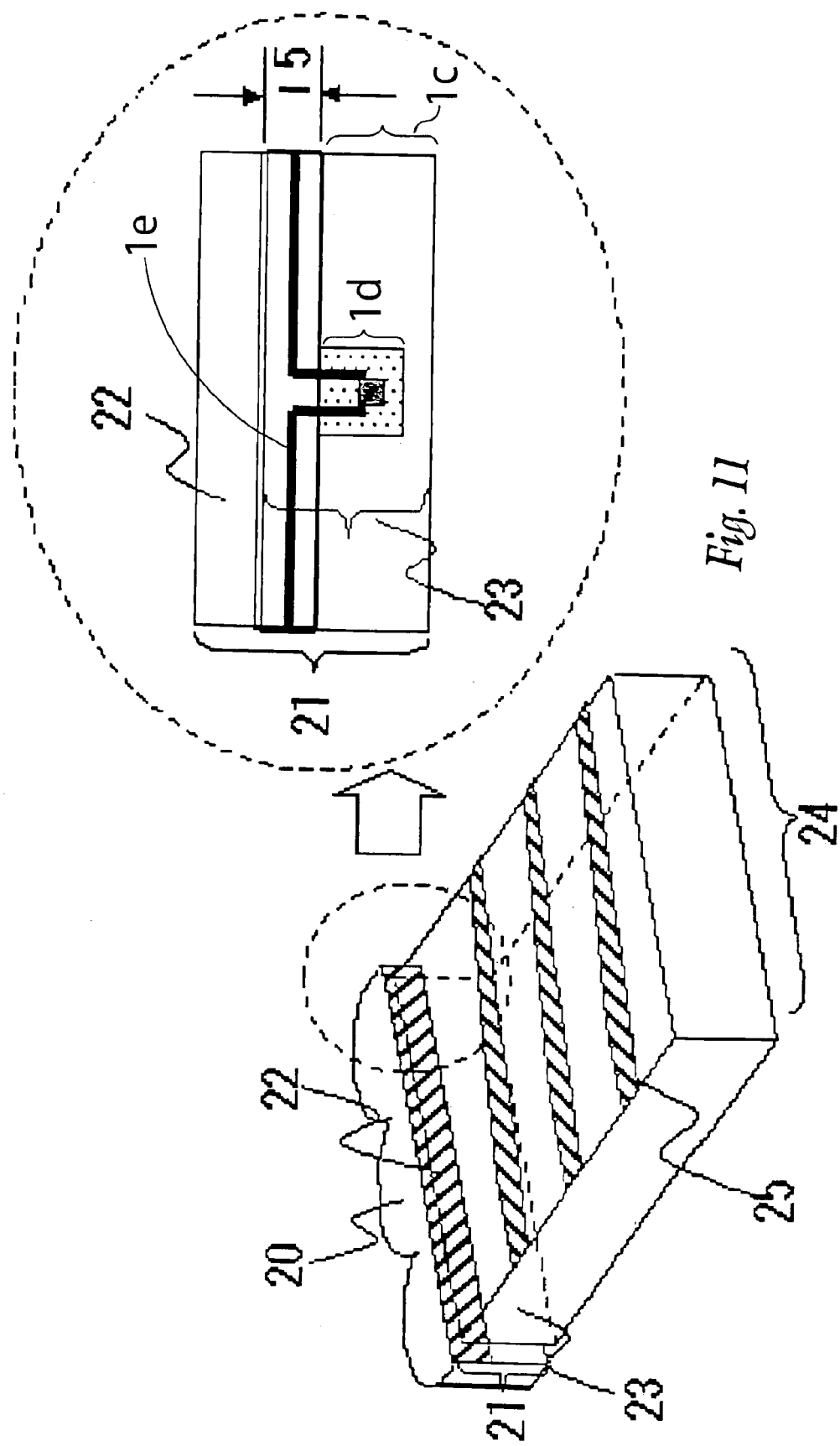
FIG. 11 is a schematic explanatory view for explaining an arrangement relationship between the light-emitting lamp and an illumination device in the sixth embodiment.
Figure 13:
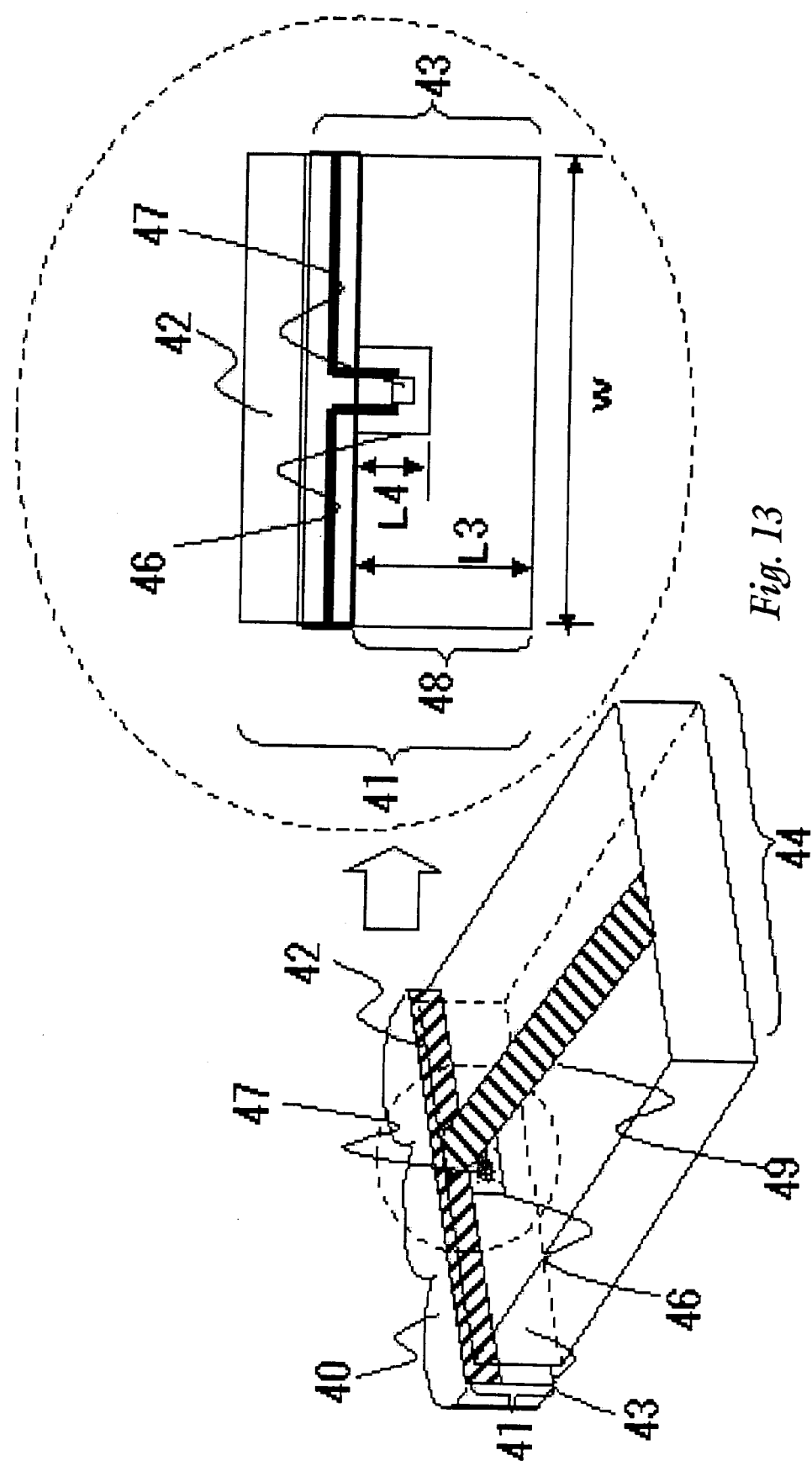
FIG. 13 is a schematic explanatory view for explaining an arrangement relationship between the light-emitting lamp and an illumination device in the sixth embodiment.

Subsequently, a light-emitting lamp according to the sixth embodiment of the present invention will be explained with reference to FIGS. 10 to 14. FIG. 10 is a schematic explanatory view of a light-emitting lamp according to the sixth embodiment, wherein (a) is a schematic perspective view and (b) is a schematic front view. Moreover, FIGS. 11 and 13 are schematic explanatory views for explaining an arrangement relationship between the light-emitting lamp and a light-guiding member used for an illumination device when the light-emitting lamp of this embodiment is mounted to a flat panel display. It should be noted that the components having the same construction and same function as those in the embodiments already described are given same numerals for omitting the detailed explanation thereof. Further, the size, material, shape, its relative arrangement or the like of the components disclosed in this embodiment are not construed to limit the scope of the invention to the disclosed ones, but they are given solely for the purpose of illustration, so long as specific descriptions are not given.

The light-emitting lamp in the sixth embodiment has a construction wherein a lamp body 1 made of a transparent resin has a light-emitting device 10 incorporated therein. The light-emitting device 10 is composed of a light-emitting diode (LED) 17 that emits light by electrical power from an external electrode 12 to which an external electrode (not shown) provided at the outside of the light-emitting lamp is electrically connected with a soldering or the like. The light-emitting device 10 is disposed so as to emit light toward the reflection surface 5.

Further, the light-emitting device 10 is incorporated in the lamp body 1 by being incorporated in a forming die upon forming the lamp body 1 with a molding resin. Moreover, a fluorescent material is applied on the light-emitting surface 11 of the light-emitting diode 10, whereby light emitted from the light-emitting surface of the light-emitting device 10 is whitened. Note that 16 is an electrode, and that 40 refers to the top face just like numeral 4 used in FIG. 1. Also, 43 in FIG. 13 refers to the incident face of the light guide plate.

The lamp body 1 is formed to have a rectangular shape seen from the front (seen from the irradiated surface). This front side is defined as an emitting surface 2 that emits light toward the light-guiding member. Specifically, the emitting surface 2 is formed to have a shape along the irradiated surface of the light-guiding member (edge surface of the light-guiding member) It should be noted that the emitting surface 2 is formed to be plane in this embodiment.

In this embodiment, the emitting surface 2 is divided into an irradiation section 1c that transmits light reflected by the reflection surface 15, a first electrode section 1d having a light-emitting device 17 provided therein and a second electrode section 1e that electrically connects the light-emitting device 17 and an external power source. The first electrode section 1d and the second electrode section 1c are composed of one surface of a substrate 18 that is integrally formed with the lamp body 10. Further, on the emitting surface 2, the irradiation section 1c and the first electrode section 1d are positioned on an irradiation area that is opposite to the light-guiding member for irradiating light thereto. Moreover, the second electrode section 1c forms a non-transparent area on the emitting surface 2.

Further, in this embodiment, the substrate 18 is formed by using a non-transparent substrate made of glass-epoxy, considering a heat-resistant temperature when an LED is mounted. Moreover, it is formed such that the thickness L1 of the light-emitting lamp 1 is 1.0 mm, the thickness L2 of the substrate 18 is 0.12 mm and the thickness of the irradiated surface of the light-guiding member is 1.0 mm. Specifically, the area where the non-transparent substrate 18 and the irradiated surface of the light-guiding member are overlapped with each other is 0.12 mm in the direction of the thickness of the light-emitting lamp.

As shown in FIG. 11, when the non-transparent area 22 formed on the emitting surface 2 of the light-emitting lamp overlaps with the irradiated surface 23 of the light-guiding member within a range where its thickness is greater than 0.2 mm, i.e., in case where an area 15 in FIG. 11 is greater than 0.2 mm, an area where light is not incident on the incident edge surface 23 of the light-guiding member 24 is produced. Therefore, light is not totally reflected in the light-guiding member, with the result that band-shaped dark lines 25 are regularly observed through the liquid crystal panel. These band-shaped dark lines become a cause for remarkably deteriorating the display quality of the display device.

FIG. 12 shows a state of occurrence of the band-shaped dark lines when the area 15 where the non-transparent area 22 and the incident edge surface 23 of the light-guiding member are overlapped with each other is changed. In each condition, the case shown by ○ represents a state where the band-shaped dark lines are not observed, the case shown by Δ represents a state where the band-shaped dark lines are lightly generated but not observed through the liquid crystal panel and the case shown by x represents a state where the band-shaped dark lines are observed to thereby deteriorate the display quality.

In case where the light-emitting lamp is arranged at the edge surface of the light-guiding member, it is understood from FIG. 12 that the length in the height direction of the area 15 where the non-transparent area 22 and the incident edge surface 23 of the light-guiding member are overlapped with each other is preferably not more than 0.2 mm, and more preferably not more than 0.12 mm.

For making the overlapping section 15 of the non-transparent area 22 and the incident edge surface 23 of the light-guiding member not more than 0.2 mm, the non-transparent area formed on the light-emitting lamp may be formed as small as possible, or the light-emitting lamp may be arranged at the incident edge surface of the light-guiding member so as to provide the overlapping section 15 of not more than 0.2 mm. In order to increase the quantity of light emitted from the light-emitting lamp, the former method is preferable in which the non-transparent area formed on the light-emitting lamp is reduced as described above.

Subsequently explained with reference to FIG. 13 is a relationship between the light-emitting device formed in the light-emitting lamp and the incident edge surface of the light-guiding member.

In this embodiment, an LED device which is 0.3 by 0.3 millimeters square is used as a light-emitting device 47. Further, an emitting surface 41 formed on the light-emitting lamp is formed to have a length 13 in the widthwise direction of its irradiation section 48 of 0.88 mm, wherein the LED is positioned at an approximately center in the widthwise direction of the irradiation area 48.

An electrode 46 to which the light-emitting device 47 is mounted is formed to have a length 14 in the widthwise direction of 0.61 mm and to have a population ((14/13)×100) of the electrode 46 to the irradiation area 48 of the emitting surface of 69%.

The width of the electrode 46 is formed to be 0.4 mm and the length w of the light-emitting lamp in the widthwise direction is formed to be 11 mm, whereby the width of the electrode 46 having the LED device 47 formed thereon is formed to be negligible.

Further, the one in which a wiring electrode is formed on a glass-epoxy substrate is used as the electrode 46 like the above-mentioned substrate 42.

As shown in FIG. 13, when the population of the electrode (non-transparent area) 46 formed on the emitting surface 41 of the light-emitting lamp to the irradiation area of the emitting surface exceeds 70%, an area where light is not incident is produced in the thickness direction of the light-guiding member 44 in case where it is matched to the incident edge surface of the light-guiding member that is the subject to be irradiated. Therefore, line-shaped dark lines 49 are observed on the light-guiding member 44. In case where an image is observed through a display device such as a liquid crystal panel or the like, the display quality is remarkably deteriorated.

FIG. 14 shows a relationship between the population that the electrode section 46 holds the irradiation area of the emitting surface and the line-shaped dark lines. The mark ○ represents a state where the line-shaped dark lines are not observed, the mark Δ represents a state where the line-shaped dark lines are lightly generated but gives no trouble on the display and the mark x represents a state where the line-shaped dark lines are observed to thereby deteriorate the display quality. From FIG. 14, the population ((14/13)×100) is preferably not more than 70%, and more preferably not more than 30%.

Subsequently, a manufacturing method of the light-emitting lamp used in the embodiments will be explained with reference to FIGS. 15 and 16. FIG. 15 is a schematic plan view of a substrate to which a light-emitting device or electrode is formed, FIG. 16(a) is a schematic plan view, FIG. 16(b) is a schematic longitudinal sectional view and FIG. 16(c) is a schematic cross-sectional view.

In this embodiment, a glass-epoxy substrate is used as a substrate 61, wherein the glass-epoxy substrate is router-processed to form the mounting substrate 61. Specifically, the formed substrate 61 includes a section 64 having no substrate, a substrate section having formed thereon an external electrode or an electrode 62 that electrically connects adjacent light-emitting devices and a substrate section 63 on which the light-emitting device is mounted.

Further, in this embodiment, three LEDs, serving as the light-emitting device, are arranged at the position corresponding to each electrode 63. Lengths w1, w2 and w3 of the paraboloid per one LED is formed to be 11 mm. This shape is made to correspond to the length (33 mm) of an illumination device used for a two-type liquid crystal display device. The number of LED and the length of the paraboloid can suitably be selected depending upon the necessary quantity of light or the size of the display device.

Subsequently, as shown in FIG. 15(b), the LED is bonded to be formed as the light-emitting device 65 on the electrode 63 that is formed on the substrate 61.

Then, as shown in FIG. 16, the substrate 61 and a die 66 are fitted to each other for pressing the substrate 61 by the die 66, and a resin is injected into the die to be cured. A positional adjustment is made upon fitting the substrate to the die such that each light-emitting device 65 is positioned at the focal point of the paraboloid 67, so that the emitting surface 67 of the light-emitting device 65 is formed by the paraboloid 67 of the die 66. It should be noted that epoxy resin that is a transparent resin is used as the above-mentioned resin, and this resin is subject to an injection molding. Note that 68 in FIG. 17 is the side face of the lamp's main body (similar to 6 in FIG. 1).

Subsequently, a dicing-cut is done at the position corresponding to the electrode substrate 61 and the irradiation section 64, and then, a silver deposition is made on each surface of the transparent resin 67, thereby forming the light-emitting lamp.

Figure 17:
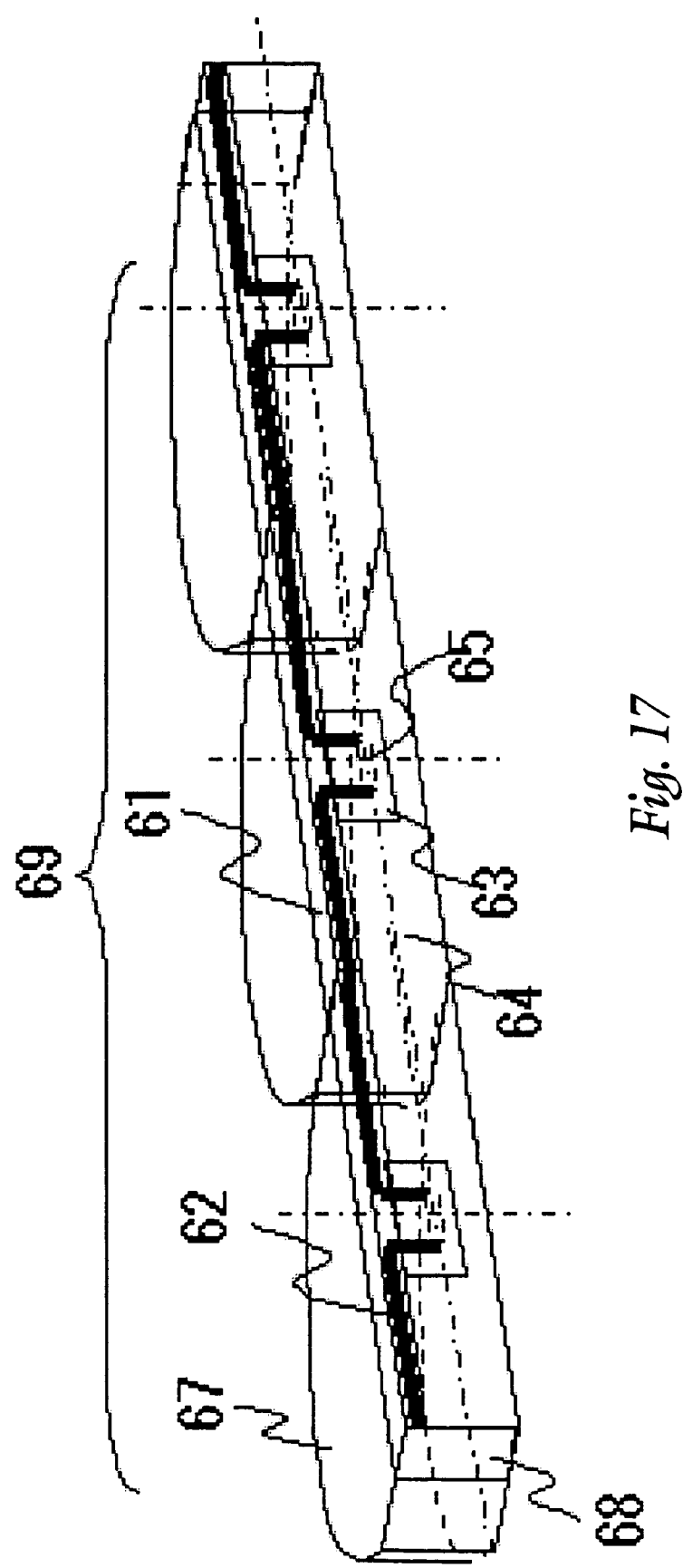
FIG. 17 is a schematic perspective view of the light-emitting lamp manufactured by the manufacturing method in the sixth embodiment.

FIG. 17 shows an entire schematic view of the light-emitting lamp 69 manufactured in this embodiment. It should be noted that the dividing line is not limited to that in this embodiment. The substrate 61 on which the electrode is formed may only be divided to be not more than 0.2 mm.

In the light-emitting lamp in this embodiment explained above, the overlapping section of the non-transparent area formed on the emitting surface of the light-emitting lamp and the incident edge surface of the light-guiding member is formed to be not more than 0.2 mm, thereby reducing the area where light is not incident on the incident edge surface of the light-guiding member, and hence, the occurrence of band-shaped dark lines can be prevented.

Further, the population of the light-emitting device formed in the emitting surface of the light-emitting lamp is held down to not more than 70%, whereby the area where light is not incident can be reduced, thereby preventing the occurrence of line-shaped dark lines.

According to the manufacturing method of the light-emitting lamp of the present invention, the non-transparent area in the light-emitting surface of the light-emitting lamp and the area where the light-emitting device is formed can be reduced with a simple method, thereby being capable of providing a light-emitting lamp having high quantity of transparent light and preventing the occurrence of band-shaped dark lines and line-shaped dark lines.

Further, a warping of the substrate that is caused upon forming the reflection surface can be reduced, thereby being capable of reducing a positional displacement of the focal distance.

Although a glass-epoxy resin is used in this embodiment for the substrate to which the lamp body 1 is bonded, a metallic substrate such as a lead frame or the like may be used. In this construction, the mounting substrate can also be used as a wiring electrode, thereby being capable of further reducing the non-transparent area. Accordingly, the occurrence of band-shaped dark lines can be reduced and the quantity of transparent light from the irradiation area can be increased.

Moreover, in case where a transparent substrate such as a glass or transparent resin is used for the substrate and a transparent electrode such as ITO is used as the wiring electrode, the non-transparent area can further be reduced. Therefore, the occurrence of band-shaped dark lines and line-shaped dark lines can further be prevented and the quantity of transparent light from the irradiation area can further be increased.

Although the silver deposition is used for the reflection layer in this embodiment, it can be made of a reflection mirror attached to the lamp body or white dye applied on the lamp body.

Embodiment 7

Figure 18A:
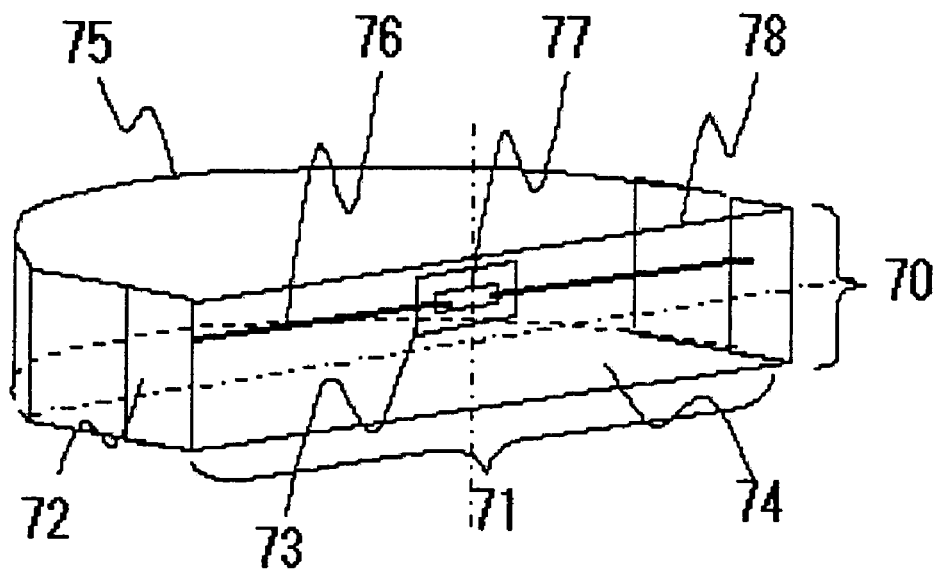
Figure 18B:
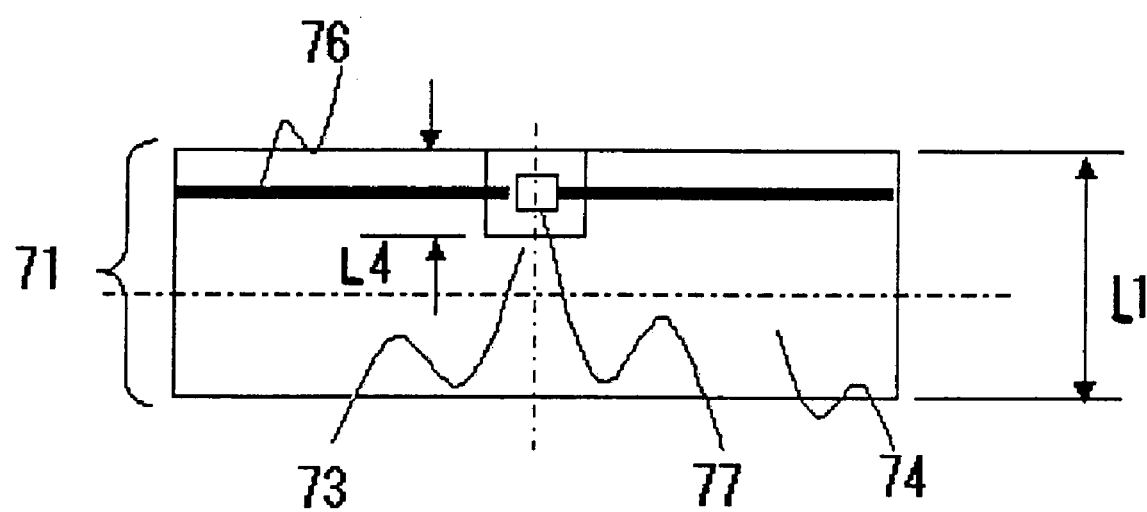

Subsequently, a light-emitting lamp according to the seventh embodiment of the present invention will be explained with reference to FIG. 18. FIG. 18 is a schematic explanatory view of a light-emitting lamp according to the seventh embodiment, wherein (a) is a schematic perspective view and (b) is a schematic front view. Although the basic construction is the same as that of the light-emitting lamp in the first embodiment, a method for forming the external electrode or the electrode for electrically connecting the adjacent light-emitting devices, the construction of the non-transparent substrate and arrangement of the position of the light-emitting device are different.

In the light-emitting lamp in the seventh embodiment, formed on an emitting surface 71 of a lamp body 70 is an electrode section 73 on which an irradiation section 74 and a light-emitting device 77 are arranged. A metal wire having a diameter of 0.025 mm is used for an external electrode 72 and for a wiring electrode 76 that electrically connects the adjacent light-emitting devices 77. Reference 75 refers to the opposite face of the lamp's main body (e.g., similar to 5 in FIG. 1), 78 refers to the substrate (similar to 18 in FIG. 10A), 84 refers to a region where there is no substrate (similar to 64 in FIG. 15), and 86 refers to a mold (similar to 66 in FIG. 16C).

Moreover, the light-emitting device 77 and the electrode 73 on which the light-emitting device 77 is formed are offset-formed at the upper section in the direction of the thickness of the emitting surface 71. Specifically, an LED device which is 0.3 by 0.3 millimeters square is used as the light-emitting device, and the electrode 73 on which the LED is mounted is formed to be 0.4 by 0.4 millimeters square.

Forming the light-emitting lamp 70 as described above can eliminate the non-transparent substrate, resulting in that quantity of light emitted from the emitting surface 71 hardly reduces.

Moreover, since there is few non-transparent area, band-shaped dark lines are hardly produced in case where the light-emitting lamp is applied to an illumination device.

Further, the population of the electrode 73 to the irradiation area on the emitting surface can be reduced to 40%, thereby being free from ling-shaped dark lines. Subsequently, a manufacturing method of the light-emitting lamp used in this embodiment will be explained with reference to FIGS. 19 and 20.

FIG. 19(*a*) is a schematic plan view of the shape of the substrate on which the light-emitting device is mounted. In this embodiment, a substrate 81 is formed by etching a lead frame substrate.

The number of the light-emitting device, the length w of the paraboloid per one LED or the like are the same as those in the sixth embodiment.

Then, as shown in FIG. 19(*b*), a light-emitting device 85 is bonded on an electrode 83 formed on the substrate 81, and then, the light-emitting device 85 and the electrode 82 are connected by using a metal wire of 0.025 mm.

Then, as shown in FIG. 20, the substrate 81 and a die 88 are fitted to each other for pressing the substrate 81 by the mold or die 86, and a resin is injected into the die to be cured. A positional adjustment is made upon fitting the substrate to the die such that each light-emitting device 85 is positioned at the focal point of the paraboloid 87, so that the emitting surface 87 of the light-emitting device 85 is formed by the paraboloid 87 of the die 86. FIG. 20(*a*) is a schematic front view, FIG. 20(*b*) is a schematic longitudinal sectional view and FIG. 20(*c*) is a schematic cross-sectional view.

Figure 21:
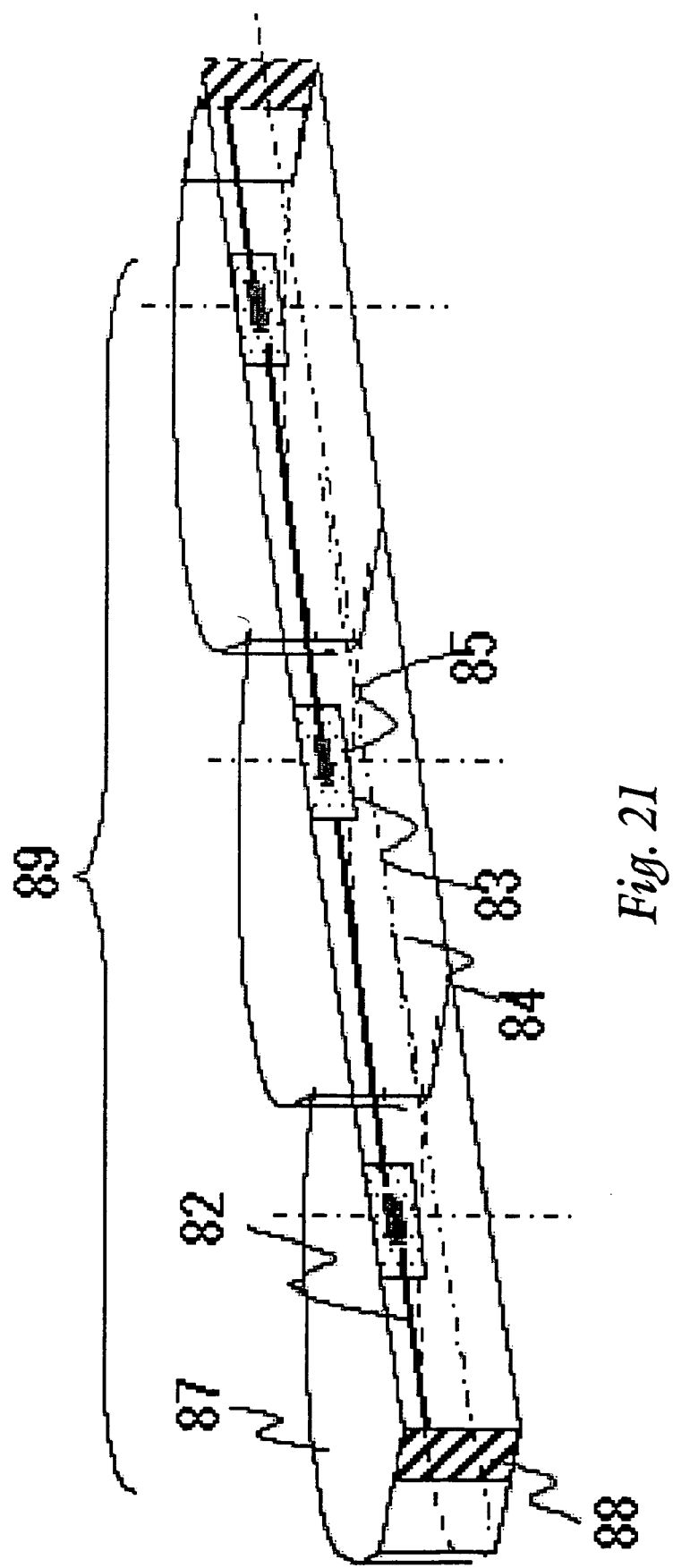
FIG. 21 is a schematic perspective view of the light-emitting lamp manufactured by the manufacturing method in the seventh embodiment.

Subsequently, a dicing-cut is made such that the non-transparent area of the substrate 81 does not remain in the emitting surface, thereby forming a light-emitting lamp 89. FIG. 21 shows an entire schematic view of the light-emitting lamp 89 manufactured in this embodiment.

As explained above, the substrate, external electrode and wiring electrode for electrically connecting the adjacent light-emitting devices, those of which are non-transparent areas, hardly exist on the emitting surface of the light-emitting lamp in this embodiment, whereby quantity of light emitted from the emitting surface hardly reduces.

Moreover, in case where the light-emitting lamp of this embodiment is applied to an illumination device, the occurrence of band-shaped dark lines can be prevented.

Further, the electrode section on which the light-emitting device is formed can be decreased by the offset arrangement of the light-emitting device. Therefore, the population of the electrode in the irradiation area on the emitting surface can be reduced, thereby being capable of preventing the occurrence of line-shaped dark lines.

As described above, the light-emitting lamp in each embodiment has the above-mentioned construction and above-mentioned advantages, but the present invention is not limited to the aforesaid construction. It can suitably be changed in design within the scope of the invention.

Specifically, the diffusion means 7 is not an indispensable feature in the present invention. Moreover, even if the diffusion means 7 is provided on the emitting surface 2, it is not limited to the construction described in each embodiment. For example, the range in which the design can suitably be changed includes that a fluorescent coating is applied or roughened surface is formed, like the second embodiment, on the concave/convex surface (convex members 7*a*) that serves as the diffusion means 7 in the third and fourth embodiments.

Further, although each embodiment explains about the light-emitting lamp wherein the upper surface 4 and the lower surface 3 of the lamp body 1 are composed of a plane, the invention is not limited thereto. For example, a slightly curved surface can be adopted. Moreover, even if the upper surface 3 and/or lower surface 2 are composed to be an approximately plane, the invention is not limited to the one having the upper surface 3 and the lower surface 2 parallel to each other like the above-mentioned embodiment. For example, the scope that the invention intends to includes the one wherein at least one of the upper surface 3 and the lower surface 2 is inclined toward the other surface from the emitting surface 2 (front surface) to the reflection surface 5 (back surface).

What is claimed is:

1. An illumination device for a flat panel display comprising:
    a light-guiding member for guiding light emitted from a light-emitting lamp, wherein
    the light-emitting lamp comprises a light-emitting device at least partially embedded in a lamp body comprising resin; wherein
    the lamp body has a reflection surface that reflects light from the light-emitting device and an emitting surface that is opposite to the reflection surface and irradiates the reflected light from the reflection surface toward the light-guiding member, wherein the light-emitting device is located between the reflection surface of the lamp body and the light-guiding member; wherein
    the emitting surface is formed to have a shape along the irradiated surface of the light-guiding member; and
    the reflection surface is formed to be curved in a lateral dimension extending parallel to a plane of the light-guiding member such that the reflected light becomes approximately parallel as it proceeds toward the light-guiding member after being reflected by the reflection surface; and
    wherein the light-emitting device is at least partially embedded in the lamp body at a side thereof at or proximate the emitting surface so that the light-emitting device is closer to the emitting surface of the lamp body than to the reflection surface of the lamp body.

2. An illumination device claimed in claim 1, wherein the emitting surface is formed to have an approximately rectangular shape seen from the irradiated surface.

3. An illumination device claimed in claim 1, wherein the emitting surface is divided into an irradiation section that transmits the light reflected by the reflection surface and irradiates the reflected light toward a subject to be irradiated, a first electrode section on which the light-emitting device is formed and a second electrode section for electrically connecting the light-emitting device and an external power source, wherein
    the length of an area, in the direction of the thickness of the light-emitting lamp, where the second electrode section is overlapped with the irradiated surface of the light-guiding member, is formed to be not more than 0.2 mm.

4. An illumination device claimed in claim 1, wherein the emitting surface is divided into an irradiation section that transmits the light reflected by the reflection surface and irradiates the reflected light toward a subject to be irradiated, a first electrode section on which the light-emitting device is formed and a second electrode section for electrically connecting the light-emitting device and an external power source.

5. An illumination device claimed in claim 1, wherein the light-emitting device is arranged to be shifted in either the upward direction or downward direction from the center of the direction of the thickness of the reflection surface.

6. An illumination device claimed in claim 1, wherein a transparent substrate is arranged on the emitting surface.

7. An illumination device claimed in claim 1, wherein an electrode that electrically connects the light-emitting device and an external power source is formed on the emitting surface, this electrode being made of a transparent material.

8. An illumination device claimed in claim 1, wherein the reflection surface is formed into a curved surface having a focal point on the light-emitting surface of the light-emitting device or in the vicinity thereof.

9. An illumination device claimed in claim 1, wherein the lamp body 1 has an upper surface and a lower surface that communicate to an upper surface and lower surface of the light-guiding member.

10. An illumination device claimed in claim 9, wherein a reflection layer is provided on at least the upper surface or the lower surface of the lamp body.

11. An illumination device claimed in claim 1, wherein the light-emitting device is an LED.

12. An illumination device claimed in claim 1, wherein diffusion means is provided on the emitting surface.

13. An illumination device claimed in claim 12, wherein the diffusion means is a fluorescent material formed on the emitting surface.

14. An illumination device claimed in claim 12, wherein the diffusion means is formed by at least one concave/convex surface.

15. An illumination device claimed in claim 14, wherein the concave/convex surface is arranged one-dimensionally.

16. An illumination device claimed in claim 15, wherein the concave/convex surface is composed of plural convex members that are formed along a direction perpendicular to a direction in which the reflected light can be seen as parallel.

17. An illumination device claimed in claim 1, wherein plural lamp bodies are arranged.

18. An illumination device claimed in claim 17, wherein the plural lamp bodies are integrally formed.

19. A light-emitting lamp claimed in claim 1, wherein the lamp body has an upper surface and a lower surface formed into a plane.

20. A light-emitting lamp claimed in claim 19, wherein a reflection layer is provided on at least the upper surface or the lower surface of the lamp body.

21. A light-emitting lamp for irradiating light toward a subject to be irradiated such as a light-guiding member or the like, comprising:
a lamp body having a light-emitting device incorporated therein; wherein
the lamp body has a reflection surface that reflects light from the light-emitting device and an emitting surface that is opposite to the reflection surface and irradiates the reflected light from the reflection surface toward the subject to be irradiated; wherein
the emitting surface is formed to have a shape along the irradiated surface of the subject to be irradiated;
the reflection surface is formed to be curved such that the reflected light becomes approximately parallel seen from one direction upon reflecting light from the light-emitting device;
wherein the emitting surface is divided into an irradiation section that transmits the light reflected by the reflection surface and irradiates the reflected light toward the subject to be irradiated, a first electrode section on which the light-emitting device is formed and a second electrode section for electrically connecting the light-emitting device and an external power source, wherein the length of an area, in the direction of the thickness of the light-emitting lamp, where the second electrode section is overlapped with the irradiated surface of the subject to be irradiated, is formed to be not more than 0.2 mm.

22. An illumination device claimed in claim 21, wherein the emitting surface is formed to have an approximately rectangular shape seen from the irradiated surface.

23. An illumination device claimed in claim 21, wherein the emitting surface is divided into an irradiation section that transmits the light reflected by the reflection surface and irradiates the reflected light toward the subject to be irradiated, a first electrode section on which the light-emitting device is formed and a second electrode section for electrically connecting the light-emitting device and an external power source.

24. An illumination device claimed in claim 21, wherein the light-emitting device is arranged to be shifted in either the upward direction or downward direction from the center of the direction of the thickness of the reflection surface.

25. An illumination device claimed in claim 21, wherein a transparent substrate is arranged on the emitting surface.

26. An illumination device claimed in claim 21, wherein an electrode that electrically connects the light-emitting device and an external power source is formed on the emitting surface, this electrode being made of a transparent material.

27. A light-emitting lamp claimed in claim 21 wherein the reflection surface is formed into a curved surface having a focal point on the light-emitting surface of the light-emitting device or in the vicinity thereof.

28. A light-emitting lamp claimed in claim 21, wherein the light-emitting device is an LED.

29. A light-emitting lamp claimed in claim 21, wherein diffusion means is provided on the emitting surface.

30. A light-emitting lamp claimed in claim 29, wherein the diffusion means is a fluorescent material formed on the emitting surface.

31. A light-emitting lamp claimed in claim 29, wherein the diffusion means is formed by at least one concave/convex surface.

32. A light-emitting lamp claimed in claim 31, wherein the concave/convex surface is arranged one-dimensionally.

33. A light-emitting lamp claimed in claim 32, wherein the concave/convex surface is composed of plural convex members that are formed along a direction perpendicular to a direction in which the reflected light can be seen as parallel.

34. A light-emitting lamp claimed in claim 21, wherein plural lamp bodies are arranged so as to be integrally formed.

35. An illumination device for a flat panel display comprising:
a light-guiding member for guiding light emitted from a light-emitting lamp, wherein
the light-emitting lamp comprises a light-emitting device incorporated in a lamp body; wherein
the lamp body has a reflection surface that reflects light from the light-emitting device and an emitting surface that is opposite to the reflection surface and irradiates the reflected light from the reflection surface toward the light-guiding member; wherein the emitting surface is formed to have a shape along the irradiated surface of the light-guiding member;

the reflection surface is formed to be curved such that the reflected light becomes approximately parallel seen from one direction upon reflecting light from the light-emitting device; and wherein the emitting surface is divided into an irradiation section that transmits the light reflected by the reflection surface and irradiates the reflected light toward a subject to be irradiated, a first electrode section on which the light-emitting device is formed and a second electrode section for electrically connecting the light-emitting device and an external power source, wherein the length of an area, in the direction of the thickness of the light-emitting lamp, where the second electrode section is overlapped with the irradiated surface of the light-guiding member, is formed to be not more than 0.2 mm.

* * * * *